(12) United States Patent
Dahi et al.

(10) Patent No.: US 7,104,648 B2
(45) Date of Patent: Sep. 12, 2006

(54) HYBRID CONTACT LENS SYSTEM AND METHOD

(75) Inventors: Ali Dahi, Carlsbad, CA (US); Barry Chen, San Diego, CA (US); Joe Collins, Carlsbad, CA (US); Jerome Legerton, San Diego, CA (US); Ramezan Benrashid, Concord, NC (US)

(73) Assignee: SynergEyes, Inc., Carlsbad, CA (US)

( * ) Notice: Subject to any disclaimer, the term of this patent is extended or adjusted under 35 U.S.C. 154(b) by 0 days.

(21) Appl. No.: 10/841,726

(22) Filed: May 6, 2004

(65) Prior Publication Data

US 2004/0212779 A1    Oct. 28, 2004

Related U.S. Application Data

(63) Continuation-in-part of application No. 10/778,731, filed on Feb. 13, 2004, which is a continuation-in-part of application No. 10/657,061, filed on Sep. 5, 2003.

(60) Provisional application No. 60/408,618, filed on Sep. 6, 2002.

(51) Int. Cl.
*G02C 7/02* (2006.01)

(52) U.S. Cl. ............... 351/177; 351/160 H; 351/160 R

(58) Field of Classification Search ................. 351/177
See application file for complete search history.

(56) References Cited

U.S. PATENT DOCUMENTS

| | | | | |
|---|---|---|---|---|
| 3,594,074 A | * | 7/1971 | Rosen | 351/219 |
| 3,876,581 A | | 4/1975 | Neogi | 521/62 |
| 3,944,347 A | | 3/1976 | Barkdoll et al. | 351/160 R |
| 3,973,838 A | | 8/1976 | Page | 351/160 R |
| 4,121,885 A | | 10/1978 | Erickson et al. | 351/177 |
| 4,166,255 A | | 8/1979 | Graham | 351/160 H |
| 4,171,878 A | | 10/1979 | Kivaev et al. | 351/160 R |
| 4,193,671 A | | 3/1980 | Erickson et al. | 351/160 H |
| 4,208,362 A | * | 6/1980 | Deichert et al. | 264/1.7 |
| 4,701,288 A | | 10/1987 | Cook et al. | 264/1.38 |
| 4,702,574 A | * | 10/1987 | Bawa | 351/162 |
| 4,869,587 A | | 9/1989 | Breger | 351/161 |
| 4,874,561 A | | 10/1989 | Spector | 264/1.1 |
| 5,114,628 A | | 5/1992 | Hofer et al. | 264/1.37 |
| 5,422,687 A | | 6/1995 | Tanaka et al. | 351/161 |
| 5,433,898 A | | 7/1995 | Thakrar et al. | 264/1.7 |

(Continued)

FOREIGN PATENT DOCUMENTS

DE    1417650    *    7/1973

(Continued)

OTHER PUBLICATIONS

Search Report in related European Application No. EP 03 79 4619, mailed Oct. 14, 2005.

*Primary Examiner*—Jordan Schwartz
*Assistant Examiner*—Jessica Stultz
(74) *Attorney, Agent, or Firm*—Knobbe Martens Olson & Bear LLP

(57) ABSTRACT

A method of manufacturing a hybrid contact lens having a substantially rigid center portion and a substantially flexible outer portion, comprising forming the substantially rigid center portion, treating the substantially rigid center portion to form a coating on the perimeter of the substantially rigid portion, forming the substantially flexible outer portion around the substantially rigid center portion and chemically bonding the substantially flexible portion to the substantially rigid portion. Hybrid lenses comprising a substantially rigid center portion and a substantially flexible outer portion joined at junction comprising a first segment and a second segment are also provided.

49 Claims, 16 Drawing Sheets

U.S. PATENT DOCUMENTS

| | | | |
|---|---|---|---|
| 5,448,312 A | 9/1995 | Roffman et al. | 351/161 |
| 5,452,031 A | 9/1995 | Ducharme | 351/177 |
| 5,570,142 A | 10/1996 | Lieberman | 351/160 R |
| 5,643,249 A | 7/1997 | Amano | 606/4 |
| 5,662,706 A | 9/1997 | Legerton et al. | 623/5.13 |
| 5,771,088 A | 6/1998 | Perrott | 351/161 |
| 5,777,719 A | 7/1998 | Williams et al. | 351/212 |
| 5,800,532 A | 9/1998 | Lieberman | 623/6.26 |
| 5,800,744 A | 9/1998 | Munakata | 264/1.7 |
| 5,807,381 A | 9/1998 | Lieberman | 606/5 |
| 5,835,192 A | 11/1998 | Roffman et al. | 351/246 |
| 5,872,613 A | 2/1999 | Blum et al. | 351/177 |
| 5,880,809 A | 3/1999 | Lieberman et al. | 351/160 R |
| 5,923,397 A | 7/1999 | Bonafini, Jr. | 351/160 R |
| 5,929,969 A | 7/1999 | Roffman | 351/161 |
| 5,949,521 A | 9/1999 | Williams | 351/246 |
| 5,953,098 A | 9/1999 | Lieberman et al. | 351/160 R |
| 5,965,330 A | 10/1999 | Evans et al. | 430/231 |
| 6,043,328 A | 3/2000 | Domschke et al. | 526/274 |
| 6,050,687 A | 4/2000 | Bille et al. | 351/212 |
| 6,082,856 A | 7/2000 | Dunn et al. | 351/160 H |
| 6,086,204 A | 7/2000 | Magnante | 351/212 |
| 6,095,651 A | 8/2000 | Williams et al. | 351/246 |
| 6,149,609 A | 11/2000 | Lieberman et al. | 600/587 |
| 6,199,986 B1 | 3/2001 | Williams et al. | 351/221 |
| 6,234,631 B1 | 5/2001 | Sarver et al. | 351/212 |
| 6,241,355 B1 | 6/2001 | Barsky | 351/177 |
| 6,270,221 B1 | 8/2001 | Liang et al. | 351/221 |
| 6,271,914 B1 | 8/2001 | Frey et al. | 356/124 |
| 6,271,915 B1 | 8/2001 | Frey et al. | 356/124 |
| 6,280,435 B1 | 8/2001 | Odrich et al. | 606/5 |
| 6,305,802 B1 | 10/2001 | Roffman et al. | 351/212 |
| 6,325,509 B1 | 12/2001 | Hodur et al. | 351/160 R |
| 6,338,559 B1 | 1/2002 | Williams et al. | 351/212 |
| 6,340,229 B1 | 1/2002 | Lieberman et al. | 351/160 R |
| 6,379,005 B1 | 4/2002 | Williams et al. | 351/211 |
| 6,379,008 B1 | 4/2002 | Chateau et al. | 351/247 |
| 6,412,946 B1 | 7/2002 | Vijfvinkel et al. | 351/160 R |
| 6,416,179 B1 | 7/2002 | Lieberman et al. | 351/212 |
| 6,540,353 B1 | 4/2003 | Dunn | 351/161 |
| 6,599,285 B1 | 7/2003 | Lieberman et al. | 606/5 |
| 2003/0123024 A1 | 7/2003 | Dunn | 351/160 R |

FOREIGN PATENT DOCUMENTS

| | | |
|---|---|---|
| GB | 1417650 | 12/1975 |
| JP | 04-045420 | 2/1992 |
| WO | WO 94/06621 A1 | 3/1994 |
| WO | WO 01/28410 A1 | 4/2001 |
| WO | WO 01/89424 A1 | 11/2001 |
| WO | WO 02/30273 A1 | 4/2002 |

* cited by examiner

STEP 1

STEP 4

STEP 2

STEP 5

STEP 3

STEP 6

HYBRID CONTACT LENS SYSTEM AND METHOD

CROSS REFERENCE TO RELATED APPLICATIONS

This application is a continuation-in-part of U.S. patent application Ser. No. 10/778,731, filed Feb. 13, 2004, which is a continuation-in-part of U.S. patent application Ser. No. 10/657,061, filed Sep. 5, 2003, which claims priority to U.S. Provisional Application Ser. No. 60/408,618, filed Sep. 6, 2002, the contents of which are incorporated herein by reference in their entirety.

FIELD OF THE INVENTION

The present invention generally relates to contact lenses, and more particularly to hybrid hard-soft contact lenses.

BACKGROUND OF THE INVENTION

Vision correction is on the verge of a revolution. New technologies to measure the aberrations or distortions in the optics of the eye will soon be available to the public. These new wavefront measurement techniques such as Shack-Hartmann wavefront sensing or Talbot Interferometry can precisely measure the eye's aberrations so that vision may be corrected up to 20/10. Wavefront sensing is the method for rapidly, and very accurately, assessing the aberrations in an individual's eye to create a customized prescription for correction.

However, once the eye's aberrations have been measured, either by conventional methods or by wavefront sensing, these measurements must then be transferred into a vision correction system, such as eye surgery, spectacles, or contact lenses. Recent advances in laser refractive surgery techniques such as LASIK and photorefractive keratectomy, as well as improvements in spectacle lens manufacturing now enable the creation of highly accurate corrective prescriptions for individuals.

However, this is not the case with contact lenses. Popular soft contact lenses cannot achieve the same result as spectacles or laser refractive surgery because of dimensional variations in fabrication. Hard contact lenses, which may provide the platform to achieve the results of spectacles, are not as comfortable as soft contacts and lack the necessary positional stability on the eye.

Hybrid hard-soft contact lenses comprising a hard center portion and a relatively soft outer skirt have been developed to provide a platform for a corrective prescription and also provide the comfort of soft contact lenses. One drawback associate with such hybrid hard-soft contact lenses concerns a lack of a smooth transition between the soft and hard portions. Another drawback involves a lack of bonding strength between the soft and hard portions.

Accordingly, there exists a need for a hybrid contact lens having a junction that provides a smooth transition between the soft and hard portions as well as sufficient bonding strength between the soft and hard portions for an improved surface. There also exists a need for methods of manufacturing such a lens

SUMMARY OF THE INVENTION

The present invention provides hybrid hard-soft contact lenses and methods of manufacturing the same. Some embodiments of the invention include methods of coupling the hard section of the lens (Core) to the soft section of the lens (Skirt). Other embodiments of the invention include contact lens materials that increase oxygen transmission though the lens. Further embodiments of the invention are directed to cost-effective manufacturing methods of a hybrid hard-soft contact lens.

One aspect of the present invention involves a method of manufacturing a hybrid contact lens having a substantially rigid center portion and a substantially flexible outer portion. According to a preferred embodiment, the method comprising the steps of forming the substantially rigid center portion, treating the substantially rigid center portion to form a coating on the perimeter of the substantially rigid portion, forming the substantially flexible outer portion around the substantially rigid center portion and chemically bonding the substantially flexible portion to the substantially rigid portion. According to some embodiments, the step of forming the substantially rigid center portion comprises machining a rod of rigid gas permeable material into a primary blank. According to other embodiments, the step of forming the substantially rigid center portion comprises machining the substantially rigid center portion to form a V-shaped interface between the substantially rigid and substantially flexible materials.

Preferably, the step of treating the substantially rigid portion to form a coating comprises soaking the substantially rigid portion in a chemical solution containing methacrylate/acrylate monomers including methyl methacrylate, ethyl methacrylate, butyl methacylate or hexylmethacylate. for a predetermined amount of time. A catalyst such as a UV activator may also be employed to promote the creation of the coating. Advantageously, the coating: (1) slows the penetration of chemical solution into substantially rigid portion; (2) facilitates chemical bonding between the substantially rigid center portion and the substantially flexible outer portion; and (3) prevents changing of the physical characteristics of the substantially rigid center portion.

According to some embodiments, the coating may be treated to promote chemical bonding between the rigid center portion and the substantially flexible outer portion to extend lens service life. Treating the coating may entail softening the coating by soaking the substantially rigid portion in a chemical solution containing methyacrylate or acrylate monomers with an adhesion promoter and a UV activator for a predetermined amount of time. The method may further treating the surface with a mixture of the said chemicals with an adhesion promoter. A further step involves spinning the substantially rigid portion to create a thin layer coating and to remove excess chemical solution. The step of forming the substantially flexible outer portion preferably comprises pouring liquefied substantially flexible material around the substantially coated rigid center portion and curing the substantially flexible material, wherein the amount of time between pouring and curing is less than 1 minute. This curing step may involve the use of heat, UV curing, or combination of both. According to some embodiments, an additional step involves increasing the viscosity of the HEMA based resin by adding a predetermined amount of UV initiator and exposing it to a predetermined amount and duration of UV energy under continuous agitation. The pre-polymerized resin has minimized shrinkage and higher viscosity prevents the resin from penetrating the rigid center and modifying its physical characteristics.

Another aspect of the present invention involves a hybrid contact lens having a substantially rigid center portion and a substantially flexible outer portion joined at junction comprising a first segment and a second segment. According to some embodiments, the junction has a substantially V-shaped cross section such that the first segment is disposed at an angle with respect to the second segment. The shape of the junction may be modified: (1) to reduce the variance in expansion of the substantially flexible outer portion; (2) to create a smooth transition between the substantially rigid portion and the substantially flexible outer portion; (3) to limit the amount of substantially flexible material disposed in a transition area of the lens that encompasses the junction; and (4) to maximize the bonding surface and improve the bonding strength between the substantially rigid portion and the substantially flexible outer portion.

Figure 1:
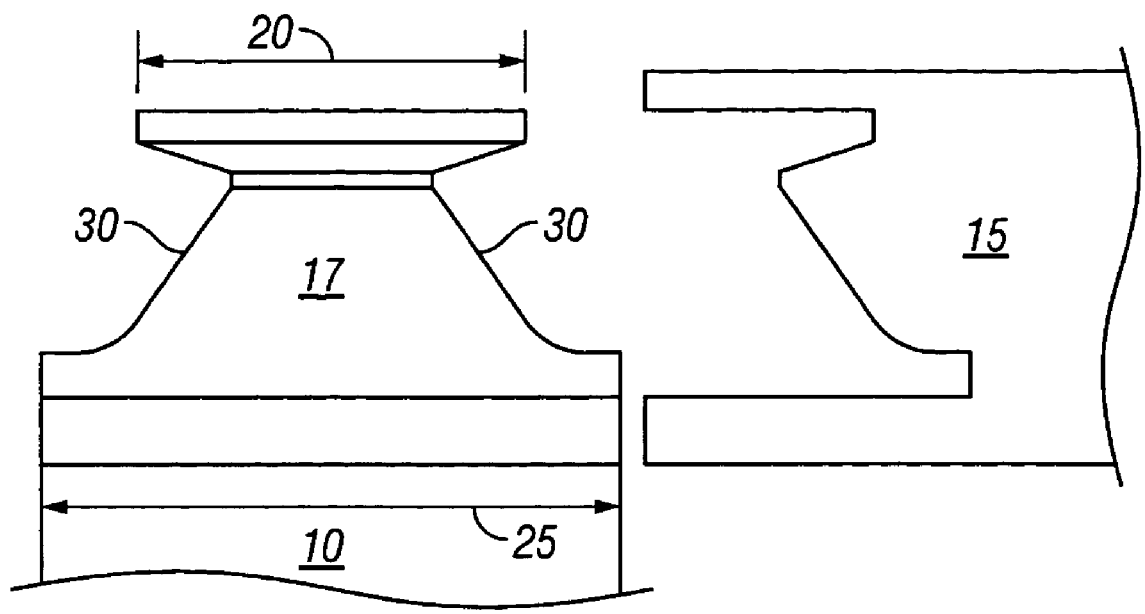
FIG. 1 is a front view of a manufacturing step used to construct a hybrid hard-soft contact lens of the present invention.
Figure 2:
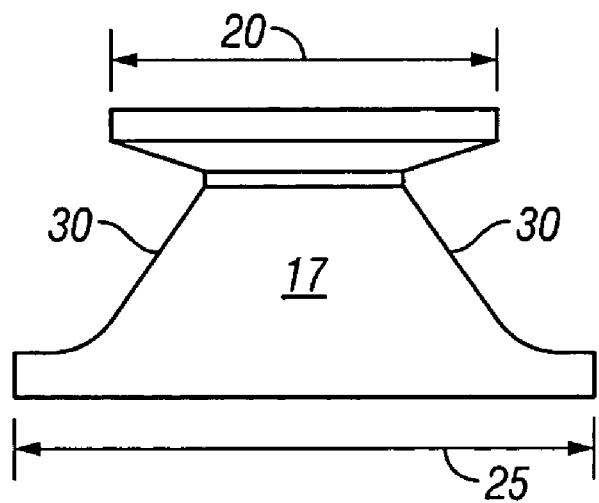
FIG. 2 is a front view of a contact lens blank after the manufacturing step illustrated in FIG. 1.
Figure 3:
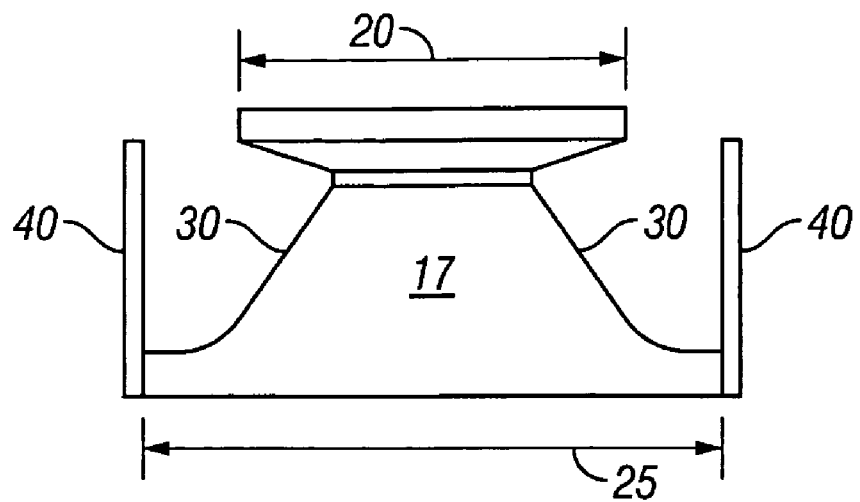
FIG. 3 is a front view of another manufacturing step used to construct a hybrid hard-soft contact lens of the present invention.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is based on a hybrid contact lens platform that offers the benefits, without the disadvantages, of both soft and gas permeable contact lenses—comfort, health, stability, superior optics and durability. The features of the present invention include lens chemistry, manufacturing processes, optical design and prescribing and fitting processes. One feature of the manufacturing processes and optical design elements is the ability to make quarter wavelength customization in order to correct for the higher order refractive aberrations that limit one's ability to see better than 20/20.

Unless defined otherwise, all technical and scientific terms used herein have the same meaning as is commonly understood by one of skill in the art to which this invention belongs. In event the definition herein is not consistent with definitions elsewhere, the definitions set forth herein will control. As used herein, "hybrid" refers to a type of contact lens that includes both hard and soft lens elements which chemically bonded or stitched together.

One embodiment of the present invention will correct normal ametropic errors (myopia, hyperopia and astigmatism) to a higher degree of visual performance than conventional contact lenses. Another embodiment of the present invention will correct for the wavefront-guided higher order aberrations and will create a new contact lens category, providing "super vision" for those whose visual requirements demand better than 20/20 acuity. Yet another embodiment of the present invention will correct for presbyopia, the gradually increasing inability to focus at close distances that usually begins after age 40. Other embodiments of the present invention may include contact lenses that incorporate several, or all of the above-described features.

Another embodiment of the present invention is a hybrid lens that combines the optical clarity, stability and durability of a gas permeable lens with the comfort of a soft contact lens. This hybrid lens has a hard gas permeable center chemically bonded to a wettable soft outer skirt. The center is highly oxygen permeable, which is important to maintaining corneal health. One of the manufacturing processes of the present invention enables this gas permeable center to be lathed to quarter wavelength precision, allowing corrections of wavefront-guided higher order refractive aberrations and providing visual performance better than 20/20.

Yet another embodiment hybrid contact lens of the present invention has a soft outer skirt with a radius of curvature greater than the base curve of the oxygen permeable center, which is suspended on the soft skirt, thus creating a lighter touch above the corneal apex. One feature of this embodiment is that the eyelid force of normal blinking creates a peristaltic-like pump that exchanges the tears under the lens, contributing to overall comfort, and eliminating dryness, the most frequent complaint of contact lens wearers. Another feature of this embodiment is that the tear layer under the lens is not only important for comfort and health, but it also has optical correction qualities as well. A layer of tears retained behind the base curve of the gas permeable lens of the present invention may correct corneal astigmatism by up to about ten diopters. Thus, a hybrid contact lens constructed according to the present invention creates a superior astigmatism correcting capability that does not rely on orientation and positioning, as do soft contact lenses.

Another embodiment of the present invention comprises a hybrid lens with a substantially rigid center that is chemically bonded to a softer outer skirt. One embodiment of the outer skirt is comprised of a modified poly(2-hydroxyethyl methacrylate) HEMA (poly-2-hydroxyethyl-methacrylate), methacrylate monomer (C1 to C6) materials including perfluorinated methacrylate, siliconated methacrylate, and a crosslinking agent. The center is a substantially rigid gas permeable-type with a gas permeability DK value greater than 30, preferably about 150. However, other embodiments may have a gas permeability DK value that may range between about 30 to about 250. Suitable materials for the substantially rigid center include fluorosiloxane acrylate, siloxane acrylate, and poly-stryene siloxane acrylate.

The substantially rigid center section may have a thickness that may range between about 0.03 millimeters (mm) to about 0.5 mm., and a diameter that may range between about 4.0 mm. to about 12.0 mm. The overall diameter of a hybrid contact lens constructed according to the present invention may range between about 10.0 mm. to about 18.0 mm.

The substantially rigid center may have a spherical or ellipsoidal ocular (i.e., eye-facing) surface. Unlike soft lenses, the substantially rigid center of the present invention contact lens is resistant to protein deposition. One feature of the present invention contact lens is that it is also highly resistant to foreign body migration as well as dislodgement from the eye during contact sports, or other vigorous activities. A contact lens constructed according to the present invention also provides excellent centering and vision correction for irregular corneas created by trauma or surgery.

Hybrid Contact Lens Geometry

One embodiment of the present invention comprises a central substantially rigid gas permeable portion having a posterior surface that is either spherical, aspherical or toroidal, which is chosen to approximate the overall toricity and sagittal depth of the cornea to be fitted. The rigid gas permeable portion may be optically clear with only the reduction in light transmission normally found in similar polymerized materials. In one embodiment the rigid portion contains colorants and additives that narrow the band of light transmitted by the lens to reduce the chromatic aberration of the lens-eye system. The anterior or posterior surface of the rigid portion may also have surface modification to correct the total low and high order aberrations of the lens-eye system. Further, the surface profile of the anterior or posterior surface may be modified to register the low and high order aberrations over the optical system of the eye to account for the consistent natural displacement of the contact lens when applied to the eye. In addition, the surface profile of the anterior or posterior surface may be modified to contain a multi-focal feature for the correction of presbyopia. Also, the anterior surface of the lens may be treated to reduce the variance in the pre-lens tear film.

In another embodiment of the present invention, the substantially rigid contact lens portion is joined to an outer soft hydrophilic portion by an intermediate adhesion enhancement zone. The adhesion enhancement zone may contain a material that bonds to the substantially rigid portion and to the soft hydrophilic portion. The soft hydrophilic portion may have a posterior surface that is spherical, aspherical, toroidal or rotationally asymmetrical to approximate the overall or meridional sagittal depth of the peripheral cornea, limbal region and sclera. The anterior surface of the soft portion may be modified to produce a thickness variation in the form of prism ballast or thin zones that utilize lid interaction to produce a resultant rotational stability.

The soft section or skirt of the contact lens is designed to control rotation by various methods. The methods include prism ballasting, thin zones, and rotationally asymmetrical contours that match the asymmetry of the cornea, limbus and sclera. According to some embodiments, the superior portion of the lens is thinner than the inferior portion.

Methods of Manufacturing a Hybrid Contact Lens

Referring to FIGS. 1–5, one method of manufacturing a hybrid contact lens according to the present invention will now be described. This method results in a fracture resistant product that is inexpensive to manufacture.

Shown in FIG. 1, a rod 10 of rigid gas permeable material is cast having the desired characteristics. Upon the completion of the curing the rod is precision ground to produce a substantially uniform diameter. The rod is then machined by tool 15 into a primary blank 17 having an anterior diameter 20 designed to conform to the collet of a computer numerically controlled lathe and a posterior diameter 25 designed to conform the outermost diameter of the hydrophilic portion of the lens for positioning in a tube, cup, or other containing device. The anterior diameter 20 may range from 6 millimeters (mm) to 24 mm, and the posterior diameter 25 may range from 6 mm to 24 mm. In one embodiment, the anterior diameter 20 may be a separate material that is bonded or otherwise attached to the primary blank 17 for enduring the clamping force of a lathe. The intermediate portion of the primary blank 17 is simultaneously machined to have a predetermined angle 30 for the interface of the rigid and hydrophilic material in the finished lens.

Figure 4:
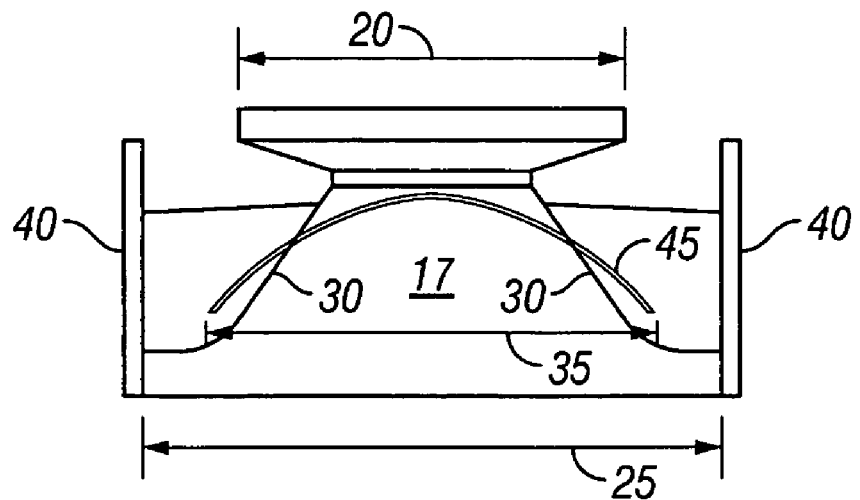
FIG. 4 illustrates another manufacturing step used to construct a hybrid hard-soft contact lens of the present invention.

One manufacturing method of the present invention has the posterior diameter 25 substantially meet, or exceed, the hydrophilic section outermost diameter 35, that is, the outermost diameter of the soft section of the contact lens, as shown in FIG. 4. In this embodiment, a boundary material 40 is then applied to produce a resultant wall, or cup to receive, and retain the hydrophilic liquid polymer. Alternatively, the primary blank 17 may be inserted into a cup, tube or other containing device to receive the hydrophilic material.

An alternative manufacturing method of the present invention includes the application of an adhesion promoter to the primary blank 17, followed by the casting of the hydrophilic polymer into the liquid holding device formed by the boundary material 40, tube, cup or other containing device.

In yet another embodiment, the primary lens blank 17 is mounted via the anterior diameter 20 in the collet of a computer numerically controlled lathe that is programmed to produce the aspherical posterior surface profile in a manner that the profile does not require polishing, or may only need a light buff, or polish. The posterior surfaced button is then mounted to a lens block wherein the axis of the block passes through the geometric center of the lens 45, shown in FIG. 4.

The assembly with the posterior surfaced button is remounted in the collet of a computer numerically controlled lathe, such as the Optoform 80 with Variform attachment, or equivalent type that is capable of producing rotationally symmetrical or non-symmetrical surfaces to high, or quarter wavelength accuracy that preferably require a light buff, or no supplemental polishing (VARIFORM and OPTOFORM are trademarks of Precitech, Inc., of Keene, N.H.). It will be appreciated to those skilled in the art that other types of lathes may be employed. The finished lens is then removed from the lathe, with or without a light buff, deblocked and cleaned followed by anterior lens surface treatment. Finally the lens undergoes hydration-extraction, sterilization and packaging.

Alternative manufacturing methods of the present invention may include: molding of the posterior surface and diamond turning of the molded blank; contour cutting of the anterior surface of a posterior curve finished blank; etching the anterior surface of a posterior curve finished blank or predicate lens anterior or posterior surface; thin film deposition of a predicate lens anterior or posterior surface; and laser ablation of a predicate lens anterior or posterior surface.

Another manufacturing method may include molding or lathing a standard base curve with a standard or semi-customized front surface, then using a thermal or laser energy to modify the refractive index of the center material to a desired optical requirement. This method replaces custom lathing or molding expenses. Another method may include molding the posterior and anterior surfaces, and yet another embodiment may include a mechanical force or thermal molding manufacturing method.

Figure 5:
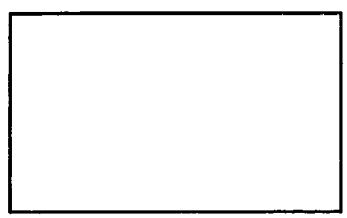
FIG. 5 illustrates an alternative manufacturing method of constructing a hybrid hard-soft contact lens of the present invention.
Figure 5:
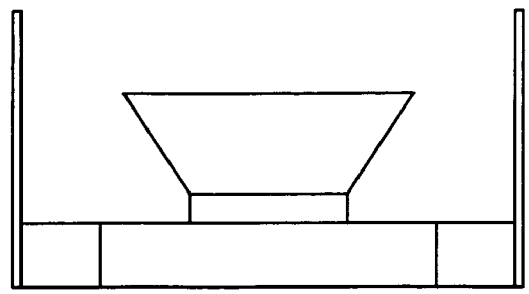
Figure 5:
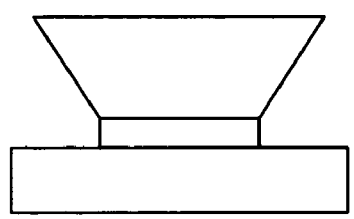
Figure 5:
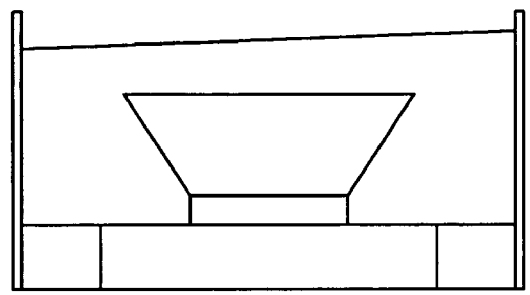
Figure 5:
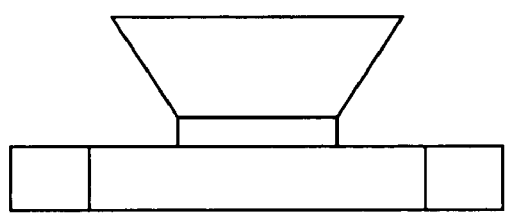
Figure 5:
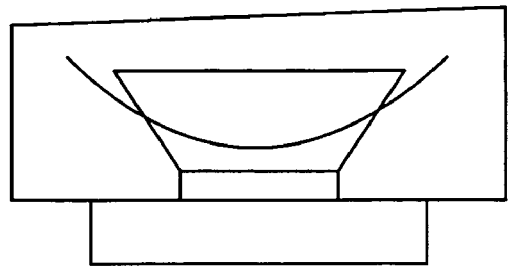

Another method of manufacturing a hybrid contact lens according to the present invention is illustrated in FIG. 5. Step 1 shows a rod of fluorosiloxane acrylate RGP material that will comprise the substantially rigid section of the hybrid contact lens. It will be appreciated to those skilled in the art that other types of materials may be employed. These other materials may include the following monomers, monomer mixtures, or their derivatives: methyl methacrylate; ethyl methacrylate; butylmethacylate, hexylmethacrylate, ethylene glycol diacrylate; octafluoro pentyl methacrylate, tetramethyldisiloxane, ethylene glycol dimethacrylate, pentafluoro phenylacrylate, 2-(trimethylsiloxyl)ethyl methacrylate, 2,2-bis(2-metharyloxyphenyl) propane, N-[2-(N,N-dimethylamino)ethyl] acrylate, 2-(N,N-dimethylamino)ethyl methacrylte, 2-(N,N-dimethylamino)propy acrylate, N-vinyl-2-pyrrolidone, N,N-dimthylacrylamide, acrylamide, acrylamine, 2-hydroxyethyl methacrylate, siloxane-ethylene glycol dimethacrylate, trifluoroethyl methacrylate, pentafluorostyrene, pentafluorophenyl methacrylate, pentafluorophenyl acrylate, pentafluoropropyl methacrylate, unsaturated polyester; p-vinyl benzylhexafluoroisopropyl ether, siliconylstyrene, siloxanyl alkylmethacrylate, and siloxanylalkylamide.

The rod, or button shown in Step 1 of FIG. 5, will preferably have a 5 millimeter (mm) to 22 mm diameter and be 2 mm to 15 mm in length. In one embodiment, the button may be bonded to another material for a subsequent operation, and as a possible cost saving. In Step 2, a plunge tool is used to remove unnecessary hard material and allow a solid section of material on one side for subsequent operations. Another method may use the plunge tool to form the button assembly from Step 1, with a shape similar to FIG. 2.

In Step 3, a spacer is formed on the gripping side of the blank for the next operation, or the blank can be bonded to a pre-form containing device to skip Step 4.

In Step 4, a tape, or other media that provides a retaining wall to hold the soft material during polymerization is applied to the blank. In Step 5, an adhesion promoter may be applied to the hard material and then the soft material is poured inside the retaining wall, or other containing device, and allowed to cure using heat, UV, or combination of heat and UV. In Step 6, the spacer, or containing device, is removed and the blank is ready for subsequent manufacturing operations.

Figure 6:
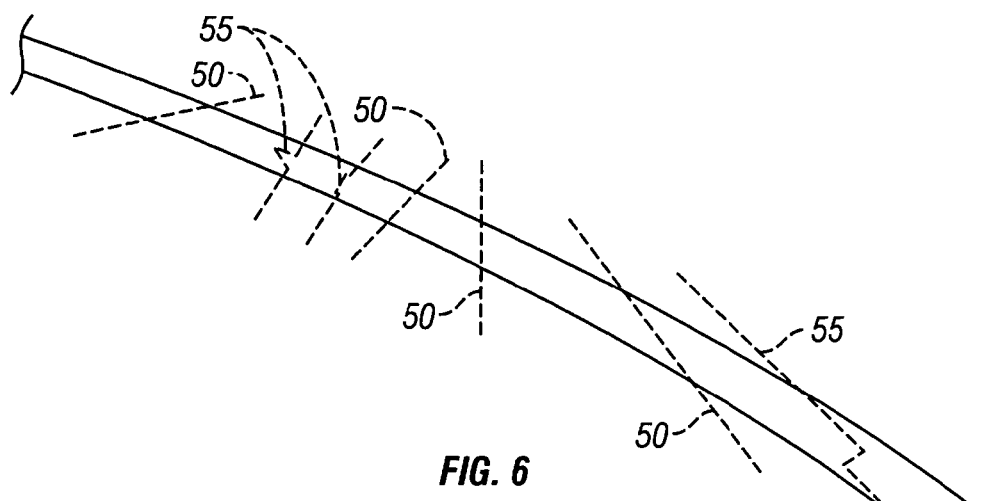
FIG. 6 illustrates several embodiments of interface geometries between a hard section and soft section of a hybrid hard-soft contact lens constructed according to the present invention.

Referring to FIG. 6, methods of coupling the hard section of the contact lens to the soft section will now be described. Conventional hybrid contact lenses are generally not durable, in part because of the weak chemical bonding between the hard and soft sections of the lens. Bonding failure may cause cornea scratching and also cost for replacing the lens. One feature of the present invention is that a variety of coupling configurations are contemplated that securely couple the hard and soft sections of a hybrid contact lens.

One embodiment of the present invention employs an angled, or sloped surface between the hard and soft contact lens sections, thereby increasing the surface area, and thus the bonding force, or strength between the two sections. Other embodiments use a variety of different surface features, or surface geometries that increase the durability and comfort of a hybrid contact lens.

For example, the bonding angle 50, shown in FIG. 6, may vary from almost 0 degrees to almost 90 degrees. That is, if a contact lens constructed according to the present invention was pressed against a flat surface, the angle defined by the interface between the hard and soft sections of the lens could vary from almost parallel to the flat surface to almost perpendicular to the flat surface.

In addition, the interface between the hard and soft sections of the contact lens may include a variety of surface configurations, or geometries 55. As shown in FIG. 6, these surface geometries 55 may include ledges, protuberances, or substantially V- or W-shaped projections. Other surface geometries 55 may include serrations, gradations, or any other shape that is not substantially straight, or planar.

Figure 6A:
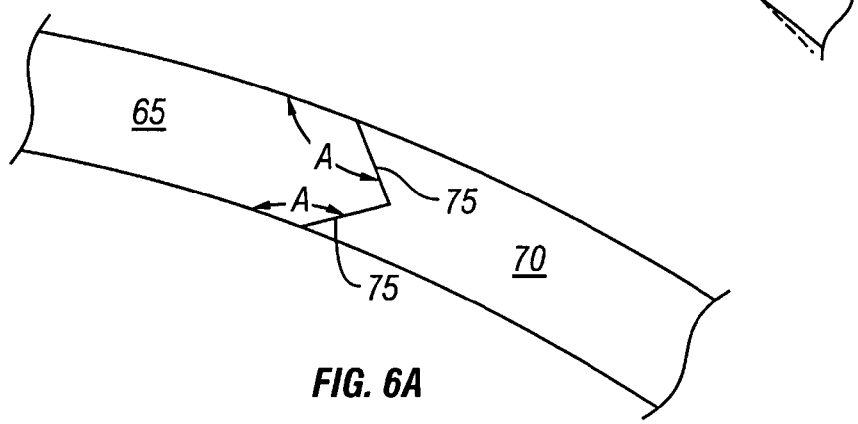
FIG. 6A illustrates a preferred embodiment of an interface geometry between a hard section and soft section of a hybrid hard-soft contact lens constructed according to the present invention.

Referring now to FIG. 6A, a hard-soft lens bonding method is illustrated. In this embodiment of the present invention, increasing the surface area between the rigid and soft lens components increases bonding strength between the two materials and minimizes lens breakage, or failure. Another advantage of this embodiment is that it provides a smooth transition between the rigid or hard, and soft materials. This produces an exceptionally comfortable lens.

As shown in FIG. 6A, an interface, or junction 75 between the hard, or substantially rigid lens material 65, and the soft lens material 70 is illustrated. Also shown is angle "A" that may range between about 95 degrees to about 170 degrees. Angle A preferably ranges between about 110 degrees to about 165 degrees. As illustrated, the interface between the hard, or substantially rigid lens material 65, and the soft lens material 70 is substantially V-shaped. Put differently, the interface comprises two intersecting planes that meet within the lens. This lens junction configuration provides a safety feature in the unlikely case of lens material separation during wear. Because of the V-shape, the edge of the hard lens material 65 is not "blade" shaped, and thus a sharp edge will not contact the cornea or eyelid, eliminating the risk of cuts, or abrasions.

The hard and soft sections of a contact lens constructed according to the present invention may be joined, or coupled by a bonding material or resin comprised of the following monomer mixtures or their derivatives: vinyl acetate; trifluoroethanol; methyl methacrylate; ethyl methacrylate, butylmethacrylate, ethylene diamine; 2-hydroxyethyl methacrylate (HEMA) and other esters of methacrylic and acylic acids with C1 to C6 carbon formulated from acrylic bases with fluorinated alkyl or aryl, silicone, styrene moiety in the structure and resultant polymers such as polystyrene; fluorine/styrene; and silicone/styrene.

The soft section of the contact lens constructed according to the present invention may be comprised of a variety of materials. These materials may include: poly HEMA; hydroxyethyl acrylate; dihydroxypropyl methacrylate; butylmethacylate, hexylmethacrylate, perfluorinated methacrylate esters, polyethylaneglycol; acetoxysilane; (trimethylsiloxyethyl)methacrylate; trimethylesiloxy; ethyleneglycol- dimethacrylate; phenylethyl acrylate; polyethylene oxide; and silicon hydrogels. It will be appreciated to those skilled in the art that other types of materials may be employed.

Hybrid Contact Lens Surface Treatments

One feature of the present invention is that a variety of contact lens surface treatments are contemplated. These surface treatments may be added, for example, for the purpose of improving the comfort of the lens by means of improving the in-vivo wetting of the lens material. Another reason for using surface treatments is to create a uniform pre-lens tear film thickness. Variations in pre-lens tear film thickness induce aberrations while a uniform pre-lens tear film thickness allows the other aberration corrections to reach full effectiveness.

One embodiment of a hybrid contact lens constructed according to the present invention may include a surface treatment that provides uniform pre-lens tear film thickness between normal blinking actions. These treatments may comprise one or more of the following embodiments: 1) Plasma—the lens is placed in the presence of gases such as oxygen and $NH_2$ containing compounds, that are modified by oscillating electromagnetic energy. This creates a surface functionalization (oxidation) that generate functional groups such as OH or NH on the lens surface, which make the lens surface more wettable; 2) Ionic surfactants—polar molecules are presented to the ionic lens surfaces with a resultant bonding of the molecules to the surface. An example is sodium dodecyl sulfide. The 12-carbon chain combined with lauryl sulfonic acid provides a substrate that supports a more uniform tear film thickness; 3) Non-ionic surfactants—The lens may be exposed to non-ionic surfactants that provide a film on the lens. An example is an ethylene glycol chain; 4) Soluable polymers—films of soluble polymers can be applied to the rigid gas permeable material after manufacturing. Examples are, N,N-dimethyacrylamide, methacylamide, HEMA, and other hydrophilic monomers. Other types of surface treatments are also contemplated.

Methods of Prescribing and Fitting a Hybrid Contact Lens

The present invention also contemplates methods of prescribing and fitting a hybrid contact lens. One method relates to non-rotating lenses for correcting high order aberrations that include methods of placing the coordinates of the aberration measurement over the coordinates of the pupil.

Another comprises methods of placing a multifocal over the coordinates of the pupil and customizing the design of the multifocal with measurements of high order aberrations and pupil size.

One method of prescribing and fitting a hybrid contact lens employs a set of precision hybrid lenses with spherical, aspherical or toroidal posterior surfaces and spherical, aspherical or toroidal anterior surfaces. For a final monofocal lens, one embodiment contains a posterior aspherical surface and an anterior spherical surface. For a final multifocal lens one embodiment contains a posterior aspherical surface and an anterior aspherical surface.

One prescribing method of the present invention employs a central registration mark or marks concentric with the lens geometric center that are placed on either the anterior or posterior surfaces or within the matrix of either the rigid central portion, the intermediate adhesion enhancement zone or in the soft portion of a contact lens. According to some embodiments, the rigid portion is at least 9 mm in diameter and a minimum of three marks are placed at a chord diameter of about 8 mm. Additionally, the diameter of the overall lens is approximately 14.0 mm.

A contact lens from the set with a posterior rigid surface that approximates the sagittal depth of the respective eye over the chord diameter of the rigid portion is placed on the eye and allowed to equilibrate. The degree of rotational and translational movement is observed. According to some embodiments, the movement observed should be less than 5 degrees rotational and 0.3 mm translational. Upon determination that the movement meets the required limit the residual high and low order aberrations are measured through the lens along with the relative coordinates of the lens marks and the pupil margin, limbal margin or other anatomical features. In the preferred embodiment an instrument having the capability of detecting the lens marks and the pupil margin along with the residual high and low order aberrations is used.

An alternative embodiment of the present invention may include infrared-responsive marks, such as one or more registration marks, one or more concentric marks, or other suitable marks, which emit or reflect infrared light. For example, some types of wavefront aberrometers employ infrared light, which is generally in the form of a laser. During examination of an eye fitted with a hybrid hard-soft contact lens constructed according to the present invention, the infrared-reflecting marks in the hybrid lens will be easily visible, enabling simultaneous evaluation of registration error, as well as aberrations. In one embodiment, indocyan dye that fluoresces when exposed to ultraviolet light is employed, but it will be appreciated that other dyes, powders, or other types of ultraviolet and infrared-responsive products may be employed.

Another method of prescribing and fitting a hybrid contact lens employs a set of precision rotating and non rotating hybrid contact lenses having known ocular surface profiles, optical corrections and thickness profiles. In one embodiment, the lenses contain circumferential marks in the mid periphery. A lens is selected and applied to the eye and allowed to equilibrate. The coordinates of the marks and the pupil are determined. The aberrations of the lens-eye system are measured. A mathematical model provides analysis of the known thickness profile, the registration error of the coordinates of the lens and the pupil, and the residual lens-eye aberrations to derive the computer numerically controlled lathe files for diamond turning a resultant thickness profile for a final contact lens having the same ocular surface profile.

For example, one prescribing and fitting method of the present invention may include the steps of: selecting the initial lens to conform to the shape of the underlying cornea; capturing an image of the circumferential marks and the pupil margin; measuring the residual low and high order aberrations of the lens-eye system; performing analysis utilizing the known ocular surface profile of the lens, the initial lens thickness profile, the registration error, and the residual lens-eye aberration error to determine the resultant files for generating a final contact lens.

Another method of prescribing and fitting a hybrid contact lens employs a set of contact lenses having a known central zone ocular surface geometry, thickness, anterior surface geometry and diameter. The preferred residual lens eye aberration correction and coordinate disparity are determined by clinical measurement, and the thickness profile variation is derived by computer modeling, or other methods, in order to specify a superiorly performing lens.

Yet another method of prescribing and fitting a hybrid contact lens employs a set of contact lenses with fixed ocular surface geometries, overall diameters and front surface geometries, over which clinical measurements are made from which the final prescription parameters are derived by computation, or other methods.

Another method of the present invention comprises correcting visual acuity deficiencies in presbyopia by reduction of the residual lens-eye aberrations. The method uses a set of hybrid contact lenses having a known ocular surface profile and thickness profile and containing circumferential marks for the purpose of registration of the final optical correction with the coordinates of the optical system of the eye. The method steps may include: selecting the initial lens to conform to the shape of the underlying cornea; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the pupil size and the residual lens-eye aberration error to determine prescription information for generating a final contact lens. In one embodiment of this method, the diameter of the near focused optical correction may be in the range of about 1.8 mm to about 4.0 mm.

Another method of the present invention employs a multifocal contact lens and corrects visual acuity deficiencies in presbyopia by reduction of the residual lens-eye aberrations. The method uses a set of multifocal hybrid contact lenses having a known ocular surface profile and thickness profile and containing circumferential marks for the purpose of registration of the final optical correction with the coordinates of the optical system of the eye. The method steps may include: selecting the initial lens to conform to the shape of the underlying cornea having a multifocal anterior surface; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the pupil size and the residual lens-eye aberration error to determine prescription information for generating a final multifocal contact lens. In one embodiment of this method, the diameter of the near focused optical correction may be in the range of about 1.8 mm to about 4.0 mm.

Another method of the present invention employs a multifocal contact lens and corrects visual acuity deficiencies in presbyopia by reduction of the residual lens-eye aberrations. This method also incorporates information relating to a light transmittance pattern. The method uses a set of multifocal hybrid contact lenses having a known ocular surface profile and thickness profile, light transmittance pattern, and containing circumferential marks for the purpose of registration of the final optical correction with the coordinates of the optical system of the eye. The method steps may include: selecting the initial lens to conform to the shape of the underlying cornea having a multifocal anterior surface; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the light transmittance pattern, the pupil size and the residual lens-eye aberration error to determine prescription information for generating a final multifocal contact lens. In one embodiment of this method, the diameter of the near focused optical correction may be in the range of about 1.8 mm to about 4.0 mm.

The above-described methods of prescribing and/or fitting a hybrid contact lens may also employ additional method steps or additional devices. For example: the method of determining the difference in the coordinates of the center of the circumferential lens marks and the pupil margin may incorporate a reticle of a biomicroscope or a camera with subsequent manual or electronic digital image detection. In addition, the method of measuring the residual aberrations of the lens-eye system may incorporate Shack-Hartmann aberrometry, aberrometers utilizing Tscheming technology, laser ray-tracing, holographic grid or Talbot interferometry technology.

Correction for Various Components of the Visible Light Spectrum

Figure 7:
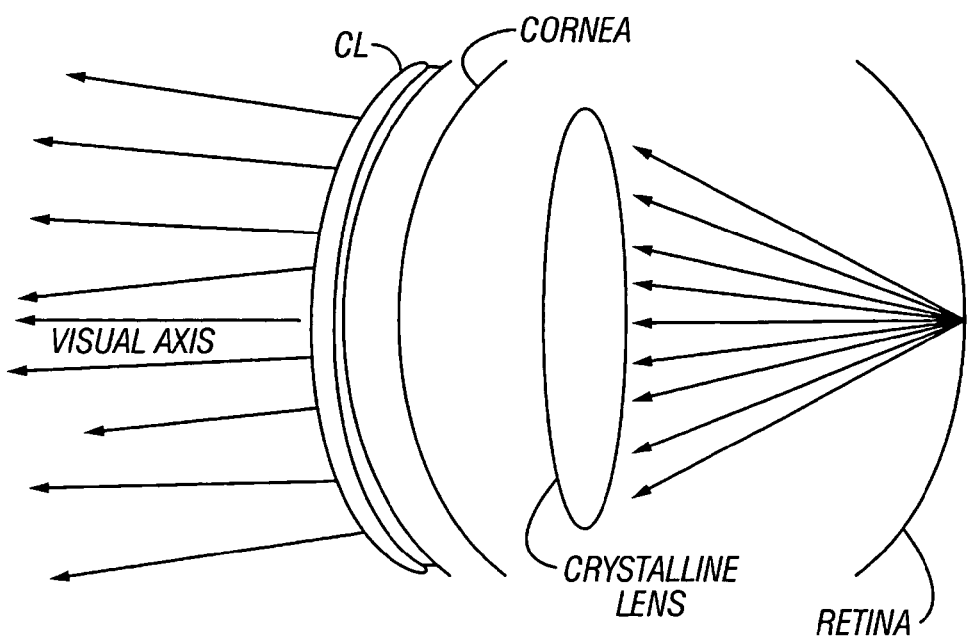
FIG. 7 is an illustration of a contact lens, several eye components and visible light rays exiting the eye-contact lens system.

Aberrometry performed with the contact lens in place provides us with knowledge of the angles that the rays emerging from the anterior lens make with respect to the visual axis. In the perfect case, the rays would all emerge parallel to the visual axis. But as illustrated in FIG. 7, in the presence of aberrations these rays make an angle with respect to the visual axis and this angle is not restricted to the plane of the paper. To correct these aberrations, there are generally two variables to modulate. The first variable is the slope of the contact lens at the point each ray emerges from the contact lens. Changing this slope will change the direction of the ray exiting the eye via Snell's Law. There will exist a slope of the anterior or posterior contact lens surface that causes the ray to exit parallel to the visual axis. The second variable is the local lens thickness at the point where each ray exits the contact lens. As this thickness is adjusted, the slope of one or both of the surfaces for the path of the ray at this point also needs to change in order to keep the emerging ray parallel to the visual axis. There will exist a set of local thicknesses and slopes that simultaneously cause all of the emerging rays to be parallel to the visual axis and keep the overall thickness of the lens reasonable, that is, not too thin or too thick.

Figure 8:
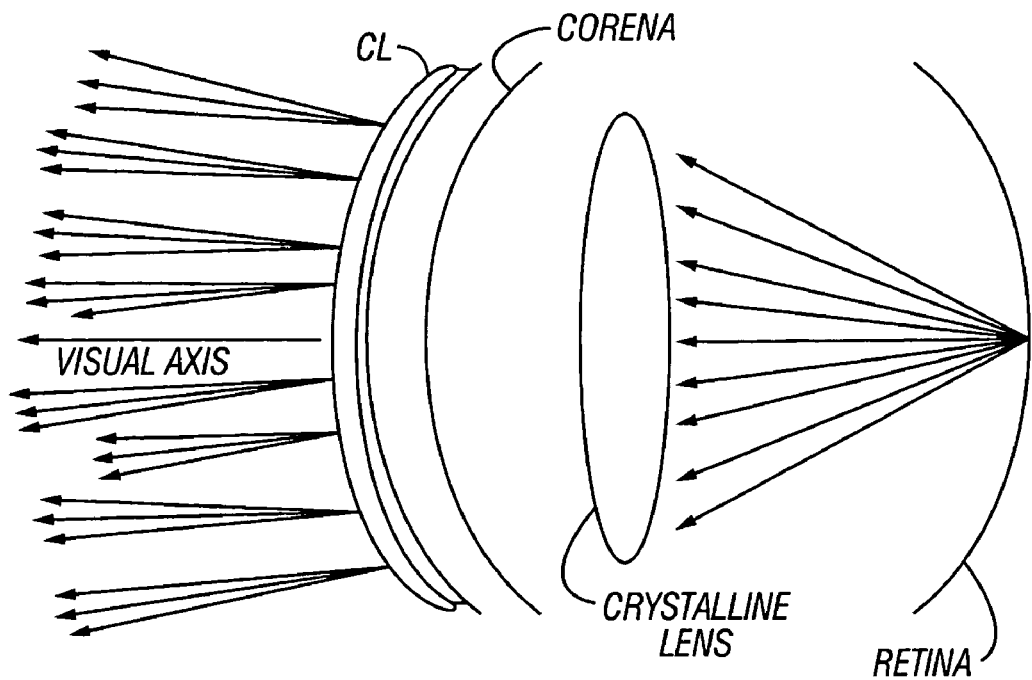
FIG. 8 is another illustration of a contact lens, eye components and visible light rays, showing the tendency for different colored light rays to exit the eye at different angles.

Aberrometry is normally only performed at one wavelength, usually in the infrared. However, as illustrated in FIG. 8, the slopes of the various rays will depend on the color of the light. In general, blue lights rays will be more convergent than the green light rays. The red light rays will be more divergent than the green light rays.

The dilemma now is which color rays should be made parallel to the visual axis. If the eye responded equally to all colors in the visible range (wavelengths of about 380 nanometers (nm) to about 780 nm), you would make the rays that corresponded to the middle wavelength parallel to the visual axis. In this manner, half of the light would be diverging and half of the light would be converging as it left the eye.

Figure 9:
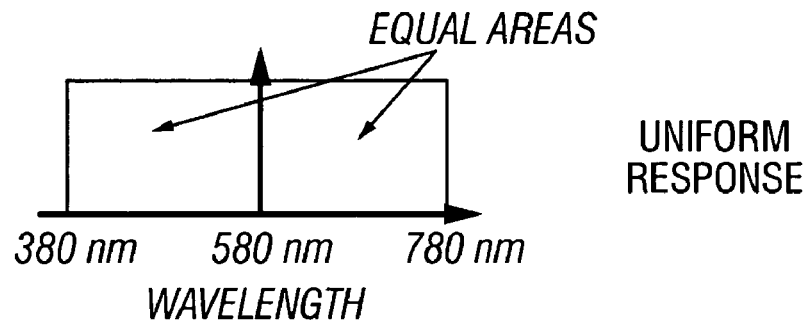
FIG. 9 illustrates a hypothetical uniform eye response to the visible light spectrum.

Referring to FIG. 9, for a uniform response, the center wavelength of the visible spectrum would be ideal for correcting aberrations since, the equal areas of the rectangles on either side of this wavelength means equal amounts of energy is distributed around this wavelength.

Figure 10:
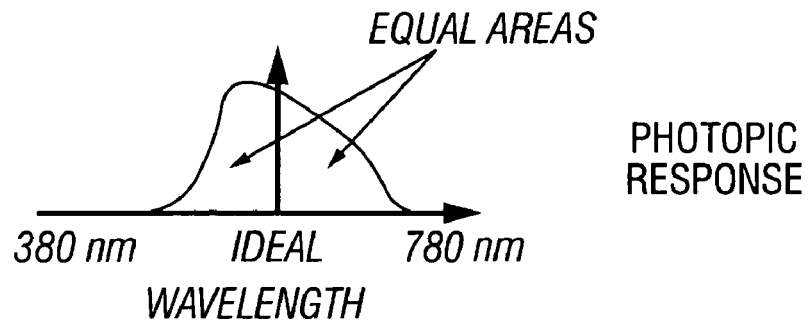
FIG. 10 illustrates a photopic eye response to the visible light spectrum.

However, the eye does not respond to all wavelengths the same. The photopic response curve, illustrated in FIG. 10, shows that the eye is more sensitive to the red/green end of the spectrum. The same sort of concept as described above can now be used to determine the ideal wavelength for correcting aberrations. The ideal wavelength gives equal areas under the photopic response curve on either side, as shown in FIG. 10.

Figure 11:
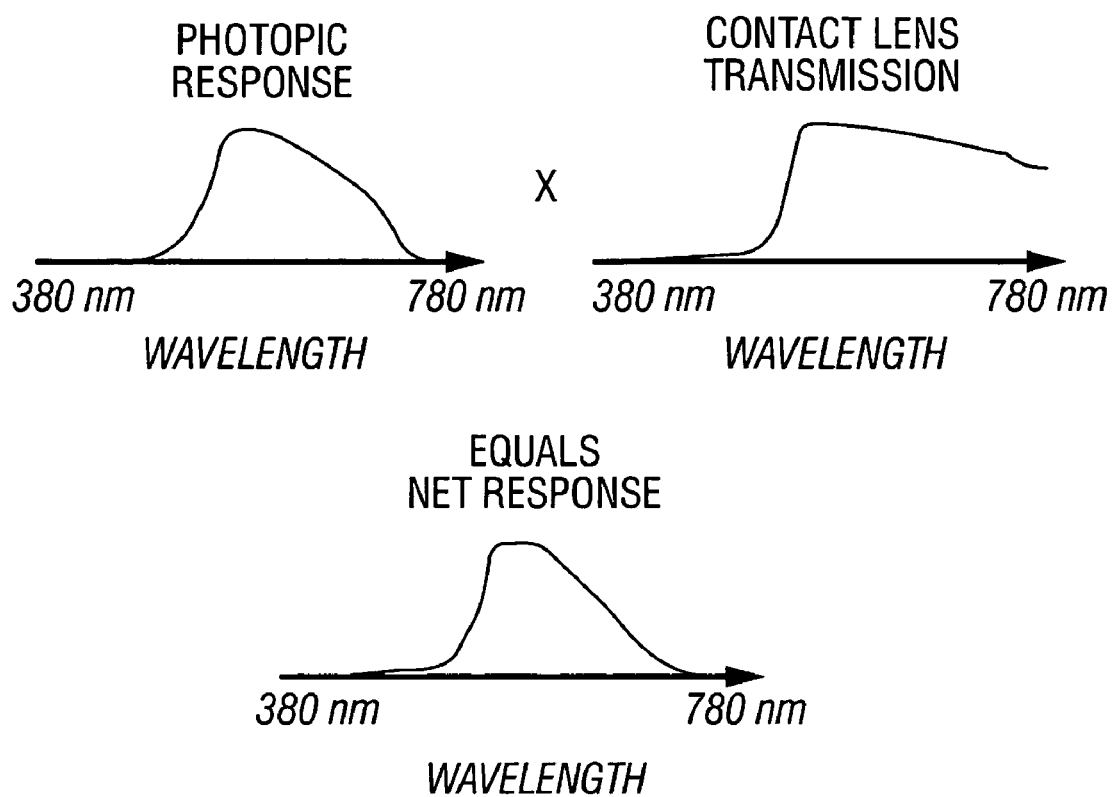
FIG. 11 illustrates one idealized net wavelength response for a contact lens constructed according to the present invention.

In addition to the variation in response of the eye to different colors, the present invention may also vary the transmission of the contact lens to different colors. This may be beneficial to reducing the effects of chromatic aberration in the eye. If the contact lens transmission is multiplied by the photopic response of the eye, a net response of the eye results, as illustrated in FIG. 11. One ideal wavelength is based on this net response which again gives equal areas under the curve. This ideal wavelength is then used as the target for correcting aberrations by the means described above.

For example, for either a final monofocal or multifocal lens, one embodiment hybrid contact lens constructed according to the present invention contains colorants that reduce the transmission at both the blue and red end of the visible spectrum thereby narrowing the band of transmitted light and potentially shifting the peak of the transmission curve of the lens. A contact lens of the present invention may therefore include color additives for the purpose of reducing light transmission, or color additives for the purpose of reducing chromatic aberration.

An alternative example utilizes a calculation based on the known bandwidth of a pre-existing lens material and the output of the monochromatic aberrometry measurement to determine the optimum lens thickness profile.

Methods of Manufacturing a Hybrid Contact Lens by Chemical Bonding

The present invention discloses a hybrid contact lens that provides clear vision, while featuring high gas permeability for enhanced corneal health and comfort. Methods of manufacturing such a hybrid contact lens are described herein with respect to FIGS. 1–6. In accordance with the principles of the present invention, methods of manufacturing a hybrid contact lens by chemical bonding will now be described with respect to FIGS. 12–29. More particularly, the methods pertain to chemically bonding a substantially flexible hydrogel soft skirt portion to a substantially rigid high DK gas permeable core center portion.

Suitable materials for the substantially flexible portion include, but are not limited to: hydroxyethylmethacrylate (HEMA); methyl methacrylate (MMA); Ethyl methacrylate (EMA); butylmethacylate (BMA), Hexylmethacylate (HMA), ehtylacylate (EA), butylacrylate (BA), aminoaklyl containing acrylate or methacrylate; N-vinyl pyrrolidone (NVP); 2-methoxyethyl methacrylate (MEMA); ethylene glycol methacrylate (EGMA); trifluoropropyl methacrylate; pentafluoropentyl methacylate; N,N-dimethylacrylamide (DMA); acrylamide; methacylamide; tetramethyldisiloxane ethylene glycol dimethacrylate; perfluorophenyl methacrylate; 2-(trimethylsiloxyl)ethyl methacrylate; N-fluoroalkyl methacylamide; bis(2-methacryloxyphenyl)-propane; (N,N-dimethylamino-ethyl)methacrylate; silicon hydrogels such as Cibavision lotrafilcon; and any combination of these materials. As would be understood to those of ordinary skill in the art, the above list is by no means exhaustive as other soft skirt materials may be employed as the substantially flexible portion without departing from the scope of the present invention.

Suitable materials for the substantially rigid portion include, but are not limited to: fluorosilicone acrylate; siliconated, styrene; fluoroacrylate; fluorometharylate, perfluorianted acrylate and methacrylate; any high DK or Hyper DK gas permeable rigid contact lens bottoms with DK of 70 (ISO), such as Boston 7 Envision, Boston EO, Boston Equales, Boston Equalens 2, Boston XO, HDS 60, HDS 100, Fluoroperm 151, Fluoroperm 92, Fluoroperm 92, Fluoro 700, Menicon SE-P, Menicon Z; any other high DK materials; and any combination of these materials. Of course, as would be understood to those of ordinary skill in the art, this list is by no means exhaustive as other materials may be employed as the substantially rigid portion without departing from the scope of the present invention.

Figure 12:
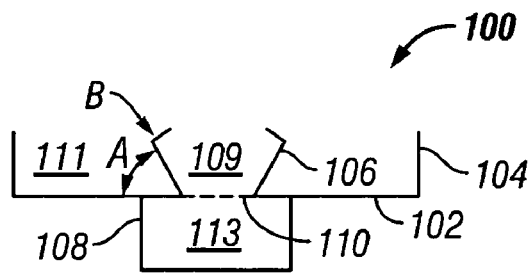
FIG. 12 is a cross-sectional view of a hybrid contact lens mold according to the principles of the present invention.

A method of manufacturing a hybrid contact lens using a molded cup will now be described with respect to FIGS. 12–15. Referring to FIG. 12, molded cup 100 comprises horizontal surface 102, a cylindrical outer wall 104 disposed substantially normal to horizontal surface 102 and a cylindrical inner wall 106. The area within inner wall 106 comprises a cylindrical inner section 109 for receiving substantially rigid material, and the area between the inner and outer walls comprises a cylindrical outer section 111 for receiving substantially flexible material.

Inner wall 106 preferably comprises a pre-form optical grade divider that divides the substantially rigid inner portion and the substantially flexible outer portion. In addition, inner wall 106 preferably is bondable with both rigid and flexible materials used to form the contact lens. Suitable materials for the molded cup include, but are not limited to, polypropylene, polyethylene, polyethylene terephthalate (PET), polycarbonate and optical grade plastics. The inner and outer walls optionally are coated with an adhesive to promote bonding with the flexible and rigid portions.

Preferably, a thin portion of the molded cup remains part of the finished contact lens. Alternatively, portions of the molded cup may be removed during the casting process. For example, inner wall 106 may be removed after pouring and curing the substantially rigid portion, and outer wall 104 may be removed after pouring and curing the substantially flexible portion. According to some embodiments, molded cup 100 further comprises a lower cylinder 108 that forms lower section 113, which is dimensioned to produce a gripping area that conforms to the collet of a computer numerically controlled lathe or other machining apparatus. In these embodiments, horizontal surface 102 preferably includes a central opening 110 such that lower section 113 may be filled during manufacturing. Alternatively, lower section 113 may be pre-filled before manufacturing. According to other embodiments, lower cylinder 108 is not provided.

In the illustrated embodiment, inner wall 106 or divider 106 is disposed at an angle A with respect to horizontal surface 102. Angle A may be any angle from about 5 degrees to about 175 degrees, but preferably is selected to maximize the bonding strength between the rigid and flexible portions of the contact lens. Inner wall 106 optionally includes a bend B adapted to further increase the bonding strength between the rigid and flexible portions. As would be understood to those of ordinary skill in the art, many alternative inner wall configurations may be employed without departing from the scope of the present invention. For example, examples of alternative bonding angles between the flexible and rigid portions are described above with respect to FIGS. 6 and 6A. Additionally, examples of alternative inner wall configurations will now be described.

Figure 13A:
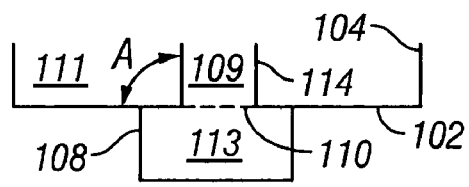
FIGS. 13A–13D are cross-sectional views of the hybrid contact lens molds of FIG. 12, wherein each view includes an alternative inner wall.
Figure 13B:
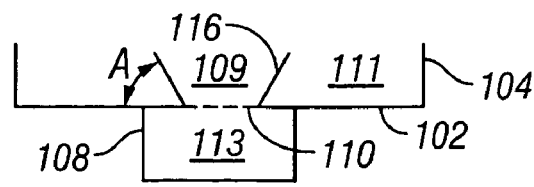
Figure 13C:
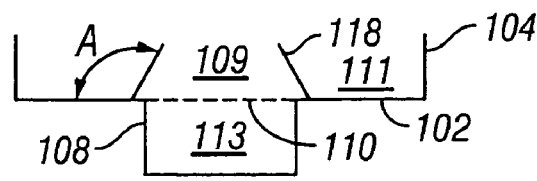
Figure 13D:
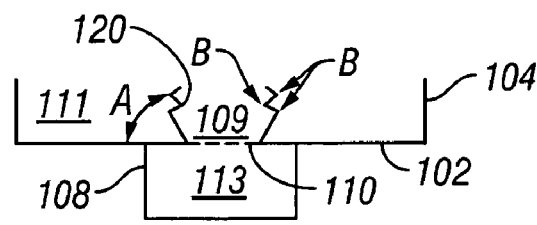

Referring to FIG. 13A, molded cup 100 includes an alternative inner wall 114 that is disposed substantially normal to horizontal surface 102 (i.e., angle A is about 90 degrees). In addition, inner wall 114 does not include a bend. Referring to FIG. 13B, molded cup 100 includes an alternative inner wall 116 that is disposed at an acute angle with respect to horizontal surface 102. Referring to FIG. 13C, molded cup 100 includes an alternative inner wall 118 that is disposed at an obtuse angle with respect to horizontal surface 102. Referring to FIG. 13D, molded cup 100 includes an alternative inner wall 120 including a plurality of bends B. Bends B preferably increase the bonding strength between the rigid and flexible portions. Additionally, inner wall 120 is disposed at an angle A with respect to horizontal surface 102. Similar to the embodiment disclosed above with respect to FIG. 12, angle A may be any angle from about 5 degrees to about 175 degrees, but preferably is selected to maximize the bonding strength between the rigid and flexible portions of the contact lens.

Figure 14:
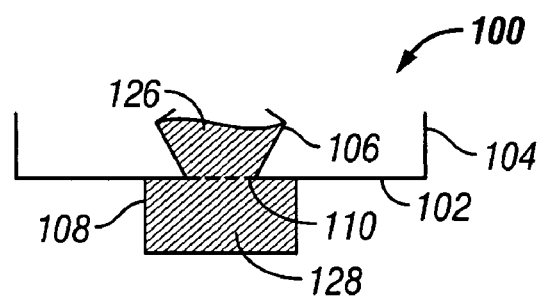
FIG. 14 is a cross-sectional view of the hybrid contact lens mold of FIG. 12 after the inner section has been filled with a substantially rigid polymer and cured.

Referring to FIG. 14, a predetermined amount of liquefied resin of substantially rigid material is poured within inner section 109 such that the material: (1) fills lower section 113 via opening 110, thereby forming gripping area 128; and (2) substantially fills inner section 109, thereby forming substantially rigid portion 126. Then, the molded cup is placed into a programmed curing environment and the rigid material is cured with heat, UV light, or a combination of both.

Alternatively, a predetermined amount of liquefied resin of substantially rigid material is poured within inner section 109 such that the material only fills lower section 113, thereby forming gripping area 128. Then, the molded cup is placed into a programmed curing environment and the rigid material is cured with heat, UV light, or a combination of both. After curing, an additional predetermined amount of liquefied resin of rigid material is poured within inner section 109 such that the additional material substantially fills inner section 109, thereby forming substantially rigid portion 126. Then, the molded cup is again placed into the programmed curing environment and the rigid material is cured with heat, UV light, or a combination of both.

Figure 15:
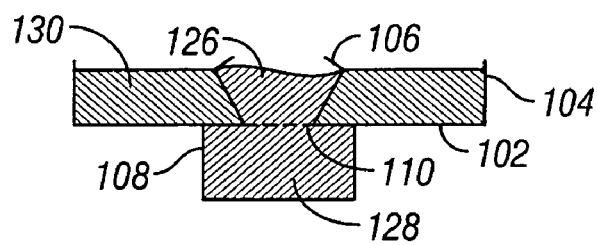
FIG. 15 is a cross-sectional view of the hybrid contact lens mold of FIG. 14 after the outer section has been filled with a substantially flexible polymer and cured.

Referring to FIG. 15, after curing the substantially rigid material, a predetermined amount of liquefied resin of substantially flexible material is poured into outer section 111, thereby forming substantially flexible portion 130. Then, the molded cup is again placed into the programmed curing environment and the flexible material is cured with heat, UV light, or a combination of both. After curing the flexible material, the lens is ready to be lathed, or otherwise machined, into a finished, fracture-resistant hybrid contact lens.

A method of manufacturing a hybrid contact lens using a block mold will now be described with respect to FIGS.

Figure 16:
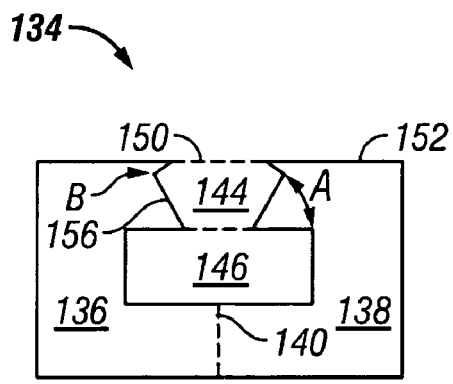
FIG. 16 is a cross-sectional view of an alternative hybrid contact lens mold according to the principles of the present invention.

16–21. Referring to FIG. 16, block mold 134 comprises a pair of halves 136, 138 that are attached along a breaking plane 140. Block mold halves 136, 138 preferably are symmetric about breaking plane 140. Block mold 134 further comprises a central void 144, 146 that defines an upper section 144 and a lower section 146. Central void 144, 146 forms an opening 150 in a substantially horizontal top surface 152 of block mold 134 such that the upper and lower sections may be filled with liquefied resin of the rigid material to form the hard portion of the contact lens.

According to some embodiments, lower section 146 preferably is dimensioned to produce a gripping area that conforms to the collet of a computer numerically controlled lathe or other machining apparatus. In these embodiments, an opening 148 exists between the upper and lower sections such that lower section 146 may be filled with liquefied resin during manufacturing. According to other embodiments, lower section 146 is not provided.

Upper section 144 includes an outer wall 156 formed by an inside surface of the block mold halves. Outer wall 156 forms the shape of the junction between the rigid and flexible portions of the contact lens. In the illustrated embodiment, outer wall 156 is disposed at an angle A with respect to top surface 152. Angle A may be any angle from about 5 degrees to about 175 degrees, but preferably is selected to maximize the bonding strength between the rigid and flexible portions of the contact lens. Outer wall 156 optionally includes a bend B adapted to further increase the bonding strength between the rigid and flexible portions. As would be understood to those of ordinary skill in the art, many alternative outer wall configurations may be employed without departing from the scope of the present invention. Some of these alternative outer wall configurations will now be described.

Figure 17A:
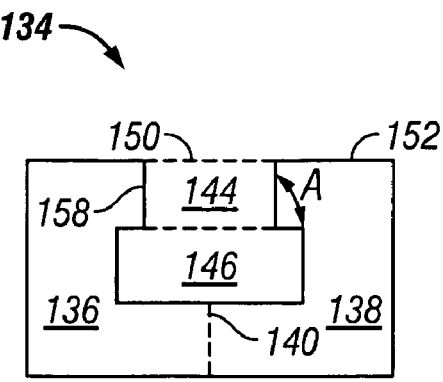
FIGS. 17A–17D are cross-sectional views of the hybrid contact lens molds of FIG. 16, wherein each view includes an alternative junction shape.
Figure 17B:
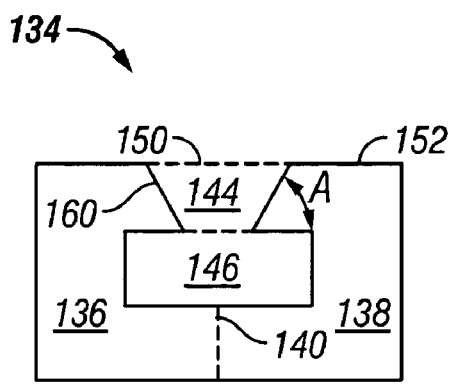
Figure 17C:
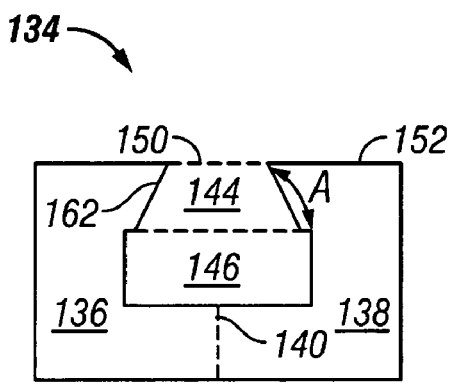
Figure 17D:
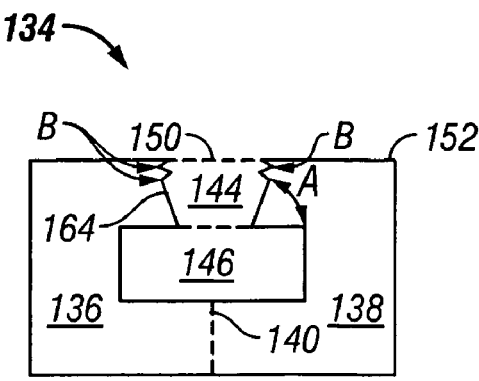

Referring to FIG. 17A, upper section 144 of the central void includes an alternative outer wall 158 that is disposed substantially normal to horizontal surface 152 (i.e., angle A is about 90 degrees). In addition, outer wall 158 does not include a bend. Referring to FIG. 17B, upper section 144 includes an alternative outer wall 160 that is disposed at an acute angle with respect to horizontal surface 152. Referring to FIG. 17C, upper section 144 includes an alternative outer wall 162 that is disposed at an obtuse angle with respect to horizontal surface 152. Referring to FIG. 17D, upper section 144 includes an alternative inner wall 164 including a plurality of bends B. Bends B preferably increase the bonding strength between the rigid and flexible portions of the contact lens.

Figure 18:
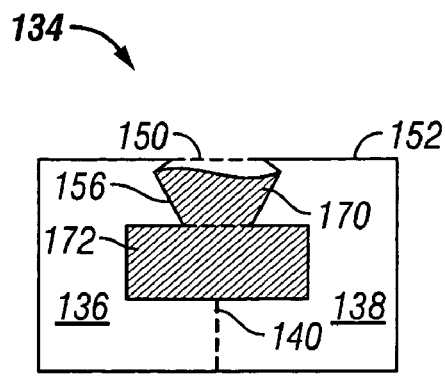
FIG. 18 is a cross-sectional view of the hybrid contact lens mold of FIG. 16 after the central void is filled with a substantially rigid polymer and cured.

Referring to FIG. 18, a predetermined amount of liquefied resin of substantially rigid material is poured into opening 150 such that the material: (1) fills the area within lower section 146, thereby forming gripping area 172; and (2) substantially fills upper section 144, thereby forming substantially rigid section 170. Then, the block mold is placed into a programmed curing environment and the rigid material is cured with heat, UV light, or a combination of both. Alternatively, a predetermined amount of liquefied resin of substantially rigid material is poured into opening 150 such that the material only fills the area within lower section 146, thereby forming gripping area 172. Then, the block mold is placed into a programmed curing environment and the substantially rigid material is cured with heat, UV light, or a combination of both. After curing, an additional predetermined amount of liquefied resin of rigid material is poured into opening 150 to substantially fill upper section 144, thereby forming substantially rigid section 170. Then, the block mold is again placed into the programmed curing environment and the rigid material is cured with heat, UV light, or a combination of both.

Figure 19:
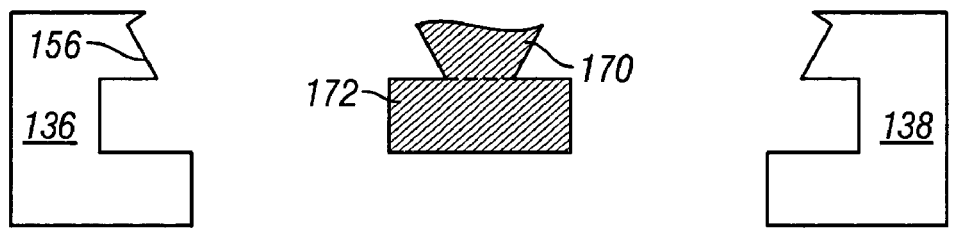
FIG. 19 is a cross-sectional view of the hybrid contact lens mold of FIG. 18 after separation of the mold.
Figure 20:
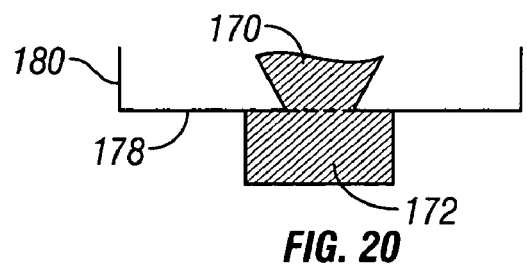
FIG. 20 is a cross-sectional view of the hybrid contact lens mold of FIG. 19 after the addition of a guard.
Figure 21:
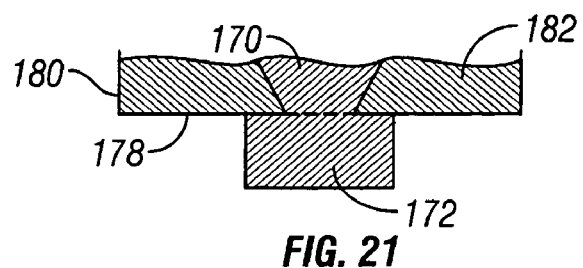
FIG. 21 is a cross-sectional view of the hybrid contact lens mold of FIG. 20 after the substantially flexible polymer is poured and cured.

Referring to FIG. 19, after curing the substantially rigid material, block mold 134 is broken along breaking plane 140 and the cured section of rigid material (comprising rigid section 170 and gripping area 172) is removed from the block mold halves. At this point, the surface of the cured section of rigid material optionally is primed or coated for better bonding. Referring to FIG. 20, a guard 178, 180 comprising a substantially horizontal section 178 and a cylindrical sidewall 180 is attached on top of gripping area 172 using a suitable adhesive. Referring to FIG. 21, a predetermined amount of liquefied resin of flexible material is then poured into the area between rigid section 170 and sidewall 180, thereby forming substantially flexible portion 182.

With further reference to FIG. 21, the materials are then placed into the programmed curing environment and the substantially flexible material is cured with heat, UV light, or a combination of both. The hybrid materials (i.e., rigid section 170 and flexible section 182) are now primed to be lathed, or otherwise machined, into a finished, fracture-resistant hybrid contact lens. Unlike the embodiment disclosed with respect to FIGS. 12–15, there is no wall or divider disposed between the rigid and flexible portions.

Figure 22:
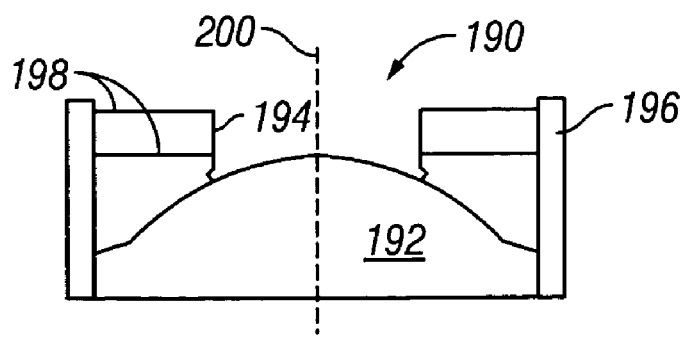
FIG. 22 is a cross-sectional view of a further alternative hybrid contact lens mold according to the principles of the present invention.

A method of manufacturing a hybrid contact lens using a base curve mold will now be described with respect to FIGS. 22–24. Referring to FIG. 22, base curve mold assembly 190 comprises base curve mold 192, inner wall 194 or divider 194, outer wall 196 disposed around the outer circumference of base curve mold 192. Optionally, one or more centering webs 198 are provided between the inner and outer walls to ensure proper positioning of inner wall 194 with respect to a vertically disposed base plane 200 that passes through the center of base curve mold 192. Inner wall 194 acts as a separator and junction surface between the rigid and flexible materials. Inner wall 194 preferably is a pre-form optical grade divider that is bondable with both rigid and flexible materials used to form the contact lens. According to some embodiments, inner wall 194 is coated with an adhesive to promote bonding with the rigid and flexible portions.

In the illustrated embodiment, inner wall 194 is substantially vertically disposed (i.e., parallel to plane 200). However, similar to the embodiments described above with respect to FIGS. 12–21, inner wall 194 may be disposed at any angle from about 5 degrees to about 175 degrees with respect to a horizontal plane. Through the process of trial and error an angle may be chosen that maximizes bonding strength between the rigid and flexible portions of the contact lens. Inner wall 194 optionally includes one or more bends B adapted to further increase the bonding strength. Of course, as would be understood to those of ordinary skill in the art, many alternative inner wall configurations may be employed without departing from the scope of the present invention.

Figure 23:
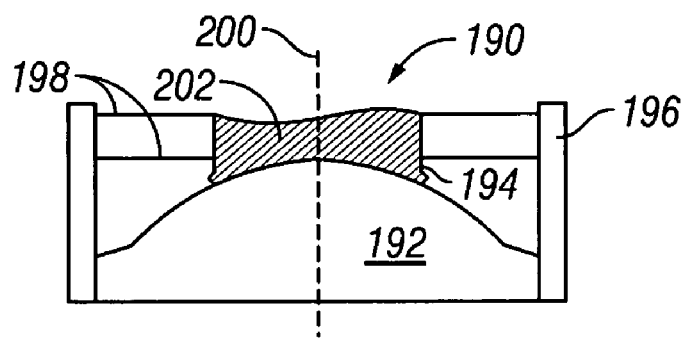
FIG. 23 is a cross-sectional view of the hybrid contact lens mold of FIG. 22 after the inner section has been filled with a substantially rigid polymer and cured.
Figure 24:
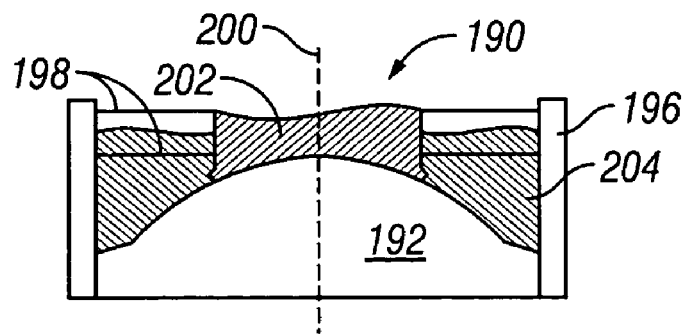
FIG. 24 is a cross-sectional view of the hybrid contact lens mold of FIG. 23 after the outer has been filled with a substantially flexible polymer and cured.

Referring to FIG. 23, a predetermined amount of liquefied resin of substantially rigid material is poured within inner wall 194 to fill the area therebetween, thereby forming substantially rigid portion 202. Then, the base curve mold assembly is placed into a programmed curing environment and the rigid material is cured with heat, UV light, or a combination of both. Referring to FIG. 24, after curing the rigid material, a predetermined amount of liquefied resin of substantially flexible material is poured into the area between inner wall 194 and outer wall 196, thereby forming substantially flexible portion 204. Then, the base curve mold assembly 190 is again placed into the programmed curing environment and the flexible material is cured with heat, UV light, or a combination of both. After curing the flexible material, the outer wall and centering webs are removed and the anterior surface of the lens is ready to be lathed, or otherwise finished.

Figure 25:
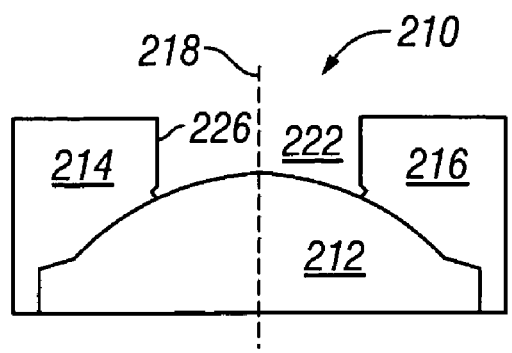
FIG. 25 is a cross-sectional view of another alternative hybrid contact lens mold according to the principles of the present invention.

A method of manufacturing a hybrid contact lens using a base curve block mold assembly will now be described with respect to FIGS. 25–29. Referring to FIG. 25, base curve block mold assembly 210 comprises base curve mold 212 and a pair of block mold halves 214, 216 that are symmetrically disposed about a vertical plane 218 passing through the center of base curve mold 212. Base curve block mold assembly 210 further comprises a central void 222 disposed in the area above base curve mold 212 between block mold halves 214, 216. Central void 222 is adapted to be filled with liquefied resin of the rigid material to form the hard portion of the contact lens.

Central void 222 includes an outer wall 226 formed by an inside surface of the block mold halves. Outer wall 226 forms the shape of the junction between the rigid and flexible portions of the contact lens. In the illustrated embodiment, outer wall 226 is disposed substantially parallel to vertical plane 218. However, similar to the embodiments described above with respect to FIGS. 12–24, outer wall 226 may be disposed at any angle from about 5 degrees to about 175 degrees with respect to a horizontal plane. Through the process of trial and error an angle may be chosen that maximizes bonding strength between the rigid and flexible portions of the contact lens. Additionally, outer wall 226 optionally includes one or more bends B adapted to further increase the bonding strength. Of course, as would be understood to those of ordinary skill in the art, many alternative outer wall configurations may be employed without departing from the scope of the present invention.

Figure 26:
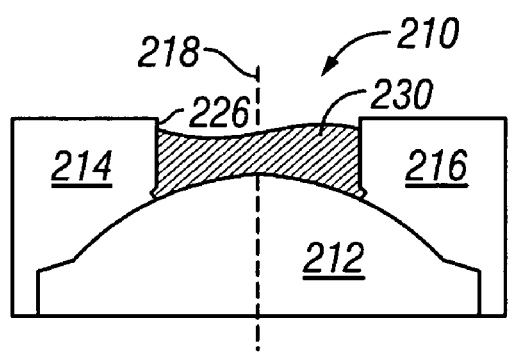
FIG. 26 is a cross-sectional view of the hybrid contact lens mold of FIG. 25 after the central void has been filled with a substantially rigid polymer and cured.
Figure 27:
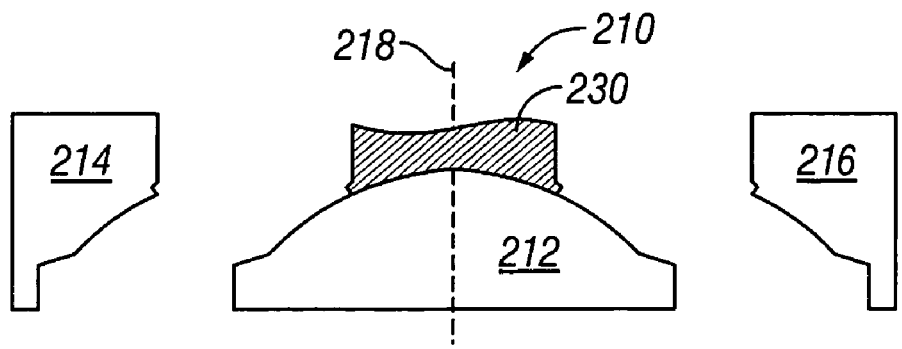
FIG. 27 is a cross-sectional view of the hybrid contact lens mold of FIG. 26 after separation of the mold.
Figure 28:
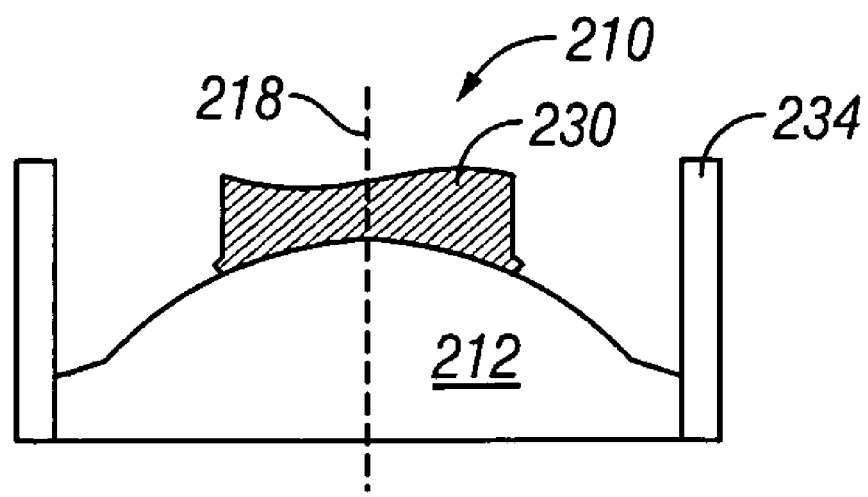
FIG. 28 is a cross-sectional view of the hybrid contact lens mold of FIG. 27 after the addition of a guard.

Referring to FIG. 26, a predetermined amount of liquefied resin of substantially rigid material is poured into central void 222 such that the material fills the area within central void 222, thereby forming substantially rigid section 230. Then, the block mold is placed into a programmed curing environment and the rigid material is cured with heat, UV light, or a combination of both. Referring to FIG. 27, after curing the rigid material, block mold halves 214, 216 are separated and removed from base curve mold 212. Referring to FIG. 28, a curvilinear sidewall 234 is attached around the perimeter of base curve mold 212 using a suitable adhesive.

Figure 29:
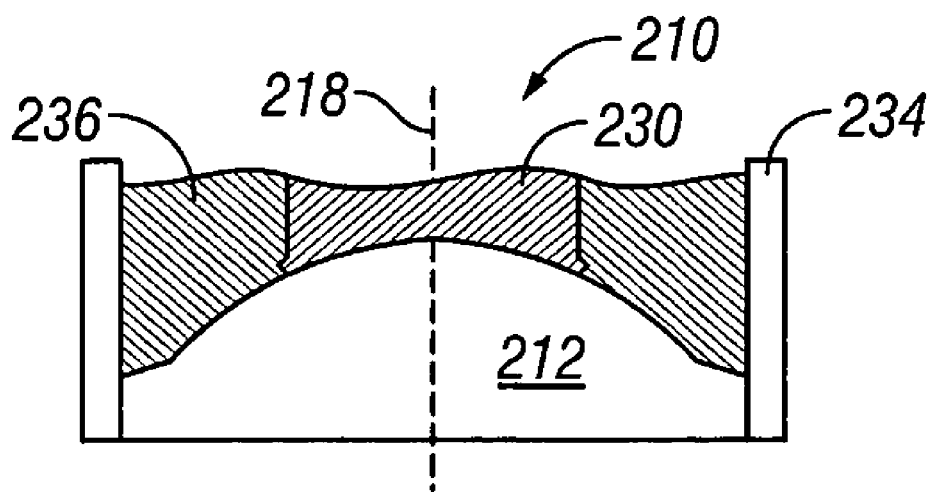
FIG. 29 is a cross-sectional view of the hybrid contact lens mold of FIG. 28 after the substantially flexible polymer is poured and cured.

Referring to FIG. 29, a predetermined amount of liquefied resin of substantially flexible material is then poured into the area between rigid section 230 and sidewall 234, thereby forming substantially flexible portion 236. The materials are then placed into the programmed curing environment and the flexible material is cured with heat, UV light, or a combination of both. After curing the flexible material, the sidewall is removed and the anterior surface is lathed, or otherwise finished.

Figure 30:
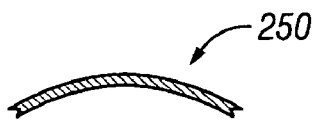
FIG. 30 is a cross-sectional view of a pre-formed substantially rigid center portion suitable for use with the pre-shape mold of FIGS. 31–33.
Figure 31:
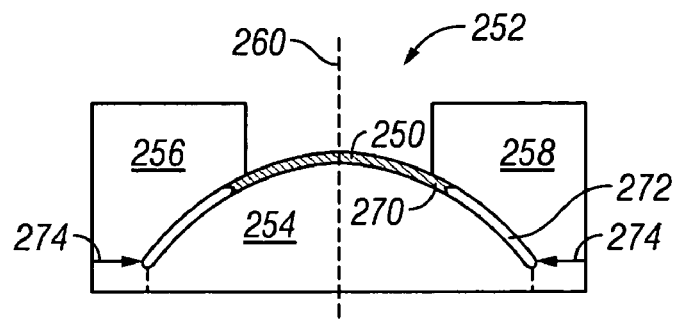
FIG. 31 is a cross-sectional view of yet another alternative hybrid contact lens mold according to the principles of the present invention.

A method of manufacturing a hybrid contact lens using a using a pre-shape mold assembly including a pre-machined substantially rigid center portion as a molded insert of a soft-skirt mold will now be described with respect to FIGS. 30–33. Referring to FIG. 30, substantially rigid center portion 250 is formed and cured before being placed in the mold assembly. According to some embodiments, the rigid center portion is pre-coated or pre-treated with an adhesive to promote bonding with the flexible outer portion. Referring to FIG. 31, pre-shape mold assembly 252 comprises a base curve mold 254 and a pair of block mold halves 256, 258 that are symmetrically disposed about a vertical plane 260 passing through the center of base curve mold 254.

Pre-shape mold assembly 252 further comprises a substantially bowl-shaped void 264 disposed between the base curve mold and the block mold halves. Bowl-shaped void 270, 272 comprises an inner portion 270 for receiving substantially rigid center portion 250 and an outer portion 272 that is filled with a substantially flexible material. In addition, pre-shape mold assembly 252 preferably includes a central void 266 disposed in the area above base curve mold 254 between block mold halves 256, 258. Central void 266 is dimensioned to permit the substantially rigid center portion to be inserted into inner portion 270 after it is formed and cured. One or more injection apertures 274 preferably are provided in the pre-shape mold assembly for filling the outer portion of bowl-shaped void 270, 272.

Figure 32:
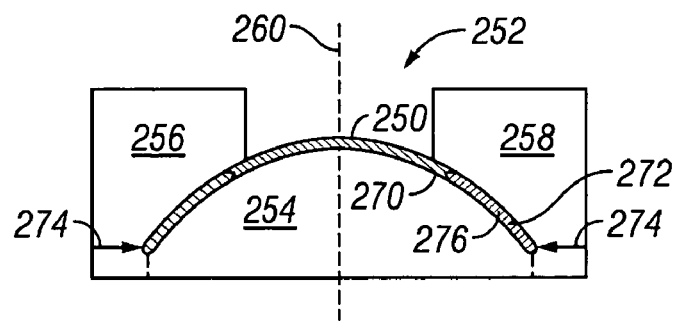
FIG. 32 is a cross-sectional view of the hybrid contact lens mold of FIG. 31 after the outer portion of the bowl-shaped void has been filled with a substantially flexible polymer and cured.
Figure 33:
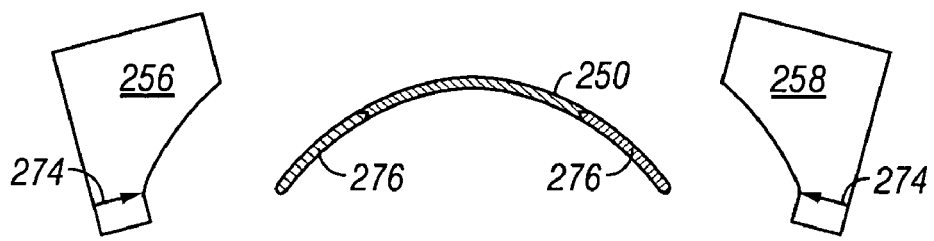
FIG. 33 is a cross-sectional view of the hybrid contact lens mold of FIG. 32 after separation of the mold.
Figure 33:
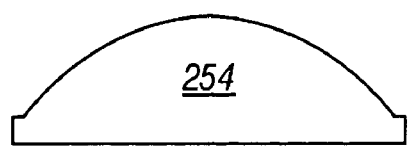

Referring to FIG. 32, a predetermined amount of liquefied resin of substantially rigid material is injection into outer portion 270, thereby forming substantially flexible outer portion 276. Then, pre-shape mold assembly 252 is placed into a programmed curing environment and the flexible material is cured with heat, UV light, or a combination of both. Referring to FIG. 33, after curing the flexible material, the mold is separated and the finished contact lens is removed from the mold. According to some embodiments, the contact lens may require machining of the anterior or posterior surfaces before it is ready for use.

As disclosed above with respect to FIG. 6, the bonding angle between the flexible and rigid portions of the contact lens may vary from almost 0 degrees to almost 90 degrees. In addition, the interface between the flexible and rigid portions may include a variety of surface configurations, including, but not limited to, ledges, protuberances, substantially V- or W-shaped projections, serrations, gradations, and any other shape that is not substantially straight, or planar. Alternatively, as disclosed above with respect to FIG. 6A, a junction may be provided between flexible and rigid portions.

With further reference to FIGS. 30–33, the substantially rigid portion may comprise one or more of the following monomers, monomer mixtures, and their derivatives: tri-meththylsiloxyl; methyl-methacrylate; ethyl-methacrylate; ethylene glycol di-methacrylate; octafluoro pentyl-methacrylate; tetra-methyldisiloxane; ethylene glycol di-methacrylate; pentafluoro phenylacrylate; 2-(trimethylsiloxyl) methacrylate; bis(2-metharyloxyphenyl) propane; N-[2-(N, N-dimethylamino)ethyl]; onethacrylate; N-[2-(n,n-dimethylamino)ethy]; methacryalte; vinyl-pyrolidone; N,N-dimathacrylamide; acrylamine; hydroxyethyl methacrylate; siloxane ethylene glycol di-methacrylate; trifluoroethyl methacrylate; pentafluorostyrene; pentafluoropropyl methacrylate; unsaturated polyester; p-vinyl benzyl hexafluoroisopropyl ether; siloxanylalkylamide; and combinations thereof. As would be understood to those of ordinary skill in the art, many other materials may be used to form the substantially rigid portion without departing from the scope of the present invention.

For the embodiment disclosed with respect to FIGS. 30–33, the substantially flexible portion may comprise one or more of the following monomer mixtures and their derivatives: poly HEMA; hydroxyethyl acrylate; dihydroxypropyl methacrylate; polyethylaneglycol; methylmethacylate, ethyl methacrylate, butylmethacylate (BMA), Hexylmethacylate (HMA), ehtylacylate (EA), butylacrylate (BA), acetoxysilane; trimethylesiloxy; ethyleneglycoldimethacrylate; phenylethyl acrylate; zero-gel; Silicon-Hydrogel; polyethylene oxide; and combinations thereof. As would be understood to those of ordinary skill in the art, many other materials may be used to form the substantially flexible portion without departing from the scope of the present invention.

For the embodiment disclosed with respect to FIGS. 30–33, the pre-treat or pre-coat between flexible and rigid portions of the contact lens may comprise an adhesive or resin on or more of the following monomer mixtures and their derivatives: vinylacetate; trifluoroethanol; methacrylates (C1 to C6); acrylates (C1 to C6); ethanediamine; 2-hydroxyethylmethacrylate (HEMA) and other esters of methacrylic acid formulated from acrylic bases; fluorine; silicone; fluorine/silicone; styrene and resultant polymers such as polystyrene; fluorine/styrene; silicone/styrene; and combinations thereof. As would be understood to those of ordinary skill in the art, many other materials may be used to form pre-treat or pre-coat without departing from the scope of the present invention.

Further methods of manufacturing a hybrid contact lens according to the present invention involve pouring the rigid and flexible materials in the reverse order such that the flexible material is poured and cured before the rigid material. For the block mold embodiments, this will require the creation of blocks that fill the central void such that the outer, flexible portion may be poured and cured first. Additional methods involve pouring both rigid and flexible materials at substantially the same time, then curing the materials simultaneously.

Additional methods of manufacturing a hybrid contact lens according to the present invention involve molding or lathing a standard base curve mold with a standard or semi-customized front surface, then using a thermal or laser energy to modify the refractive index of the center material to a desired optical requirement. Advantageously, these methods replace expensive custom lathing and molding operations. Further methods involve molding both the posterior and anterior surfaces of the contact lens. Other methods involve the application of a mechanical force or thermal molding.

Alternative manufacturing methods of the present invention may include: molding of the posterior surface and diamond turning of the molded blank; contour cutting of the anterior surface of a posterior curve finished blank; etching the anterior or posterior surface of a posterior curve finished blank or predicate lens anterior or posterior surface; thin film deposition of a predicate lens anterior or posterior surface; and laser ablation of a predicate lens anterior or posterior surface.

Figure 34:
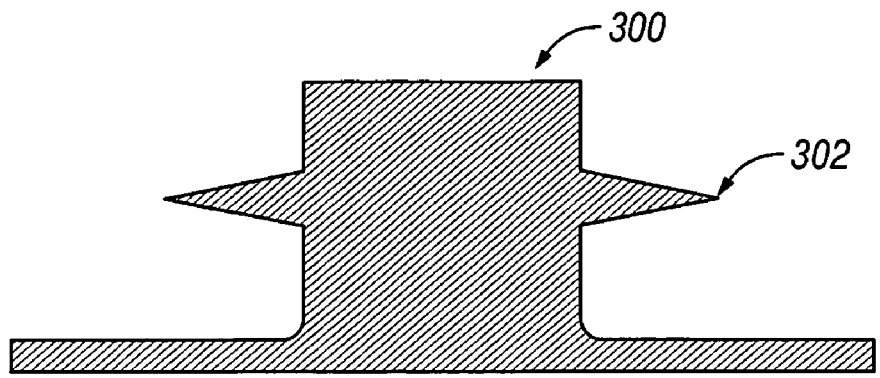
FIG. 34 is a cross-sectional view of a primary blank of substantially rigid material used in connection with a method of manufacturing a hybrid contact lens according to the principles of the present invention.

A preferred method of manufacturing a hybrid contact lens by chemically bonding the substantially flexible portion to the substantially rigid portion will now be described with respect to FIGS. 34–40. It is hereby noted that any of the above-described molding methods and technologies may be employed in conjunction with the below-described method. Initially, the substantially rigid portion is formed by casting a rod of rigid gas permeable material having the desired characteristics. After curing, the rod is precision ground to produce a substantially uniform diameter. Referring to FIG. 34, the rod is then machined into a primary blank that forms the substantially rigid portion 300 of the contact lens. A middle section 302 of substantially rigid portion 300 is simultaneously machined to have a predetermined configuration forming the interface of the rigid and hydrophilic material in the finished lens.

Figure 35:
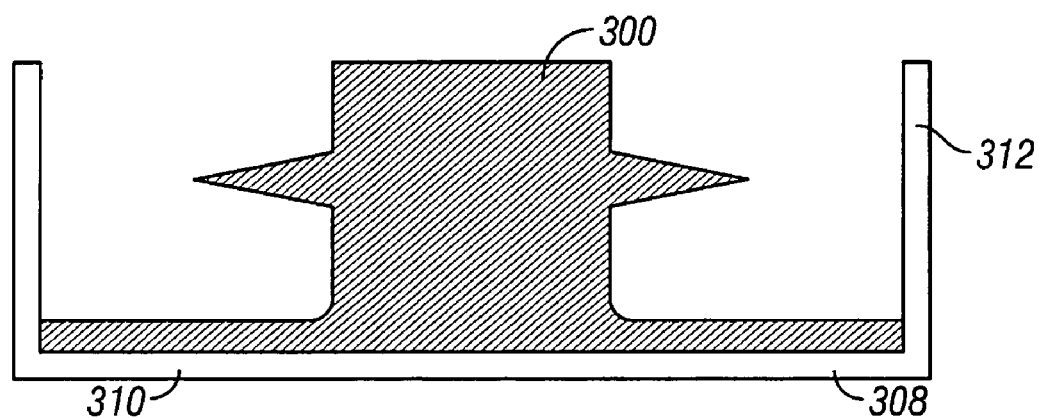
FIG. 35 is a cross-sectional view of the primary blank of substantially rigid material of FIG. 34 disposed within a cup.
Figure 36:
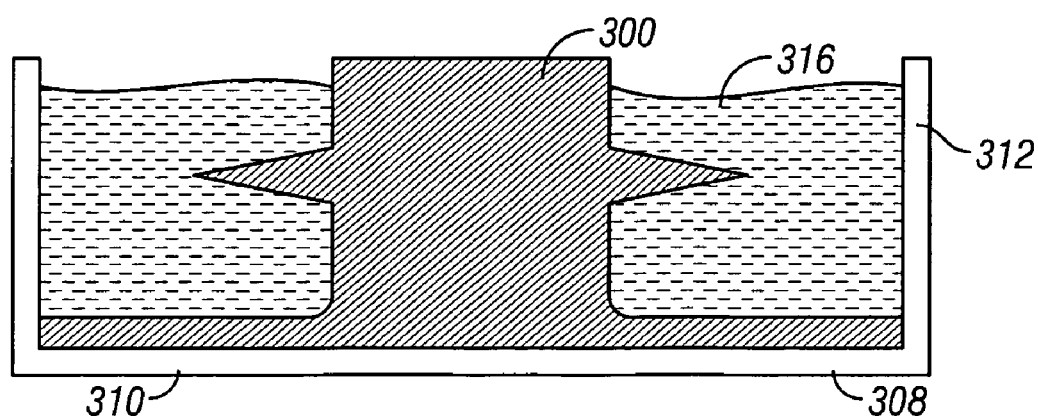
FIG. 36 is a cross-sectional view of the primary blank of substantially rigid material of FIG. 34 soaking in a chemical solution within the cup.

Referring to FIG. 35, after the substantially rigid portion 300 has been machined, the resulting blank is placed within a cup 308. Cup 308 comprises a bottom surface 310 and an outer wall 312, and optionally may include a lathe gripping area. The substantially rigid portion 300 preferably is attached to bottom surface 310 using an adhesive such as epoxy resin or other adhesive. Referring to FIG. 36, the next step involves treating the substantially rigid portion to promote adhesion to the soft skirt portion. This step entails the steps of pouring a chemical solution 316 into the cup 308, soaking the rigid portion for a predetermined amount of time and applying a catalyst to the rigid portion. Preferably, the chemical solution 316 contains methyl methacrylate (MMA) and the predetermined soaking time is from about 1 second to about 20 minutes, most preferably about 30 seconds.

Figure 37:
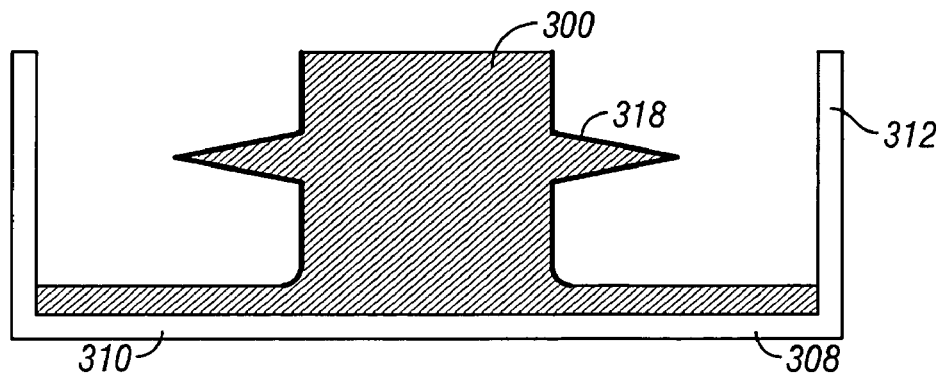
FIG. 37 is a cross-sectional view of a coating formed on the primary blank of substantially rigid material of FIG. 34.

After soaking is completed, the chemical solution 316 is removed from the cup 308 by way of a suction pump or other drainage device. Referring to FIG. 37, a coating 318 is formed on the perimeter of the substantially rigid portion 300 by applying a catalyst thereto. The catalyst preferably is a UV activator (e.g., UV light) applied to the rod for a predetermined curing time of about 1 minute to about 60 minutes, most preferably about 30 minutes. Advantageously, coating 318 facilitates subsequent bonding between the soft and hard portions of the contact lens. Moreover, coating 318 slows the penetration of the chemical solution into substantially rigid portion 300. Excessive penetration of the chemical solution into the rod alters the physical characteristics of the hard center portion. Specific physical characteristics that may be affected include oxygen permeability, index of refraction, modulus and other physical characteristics. As an alternative to forming the coating to protect the rod, an intermediate material may be employed to protect the hard center from excessive chemical penetration.

Figure 38:
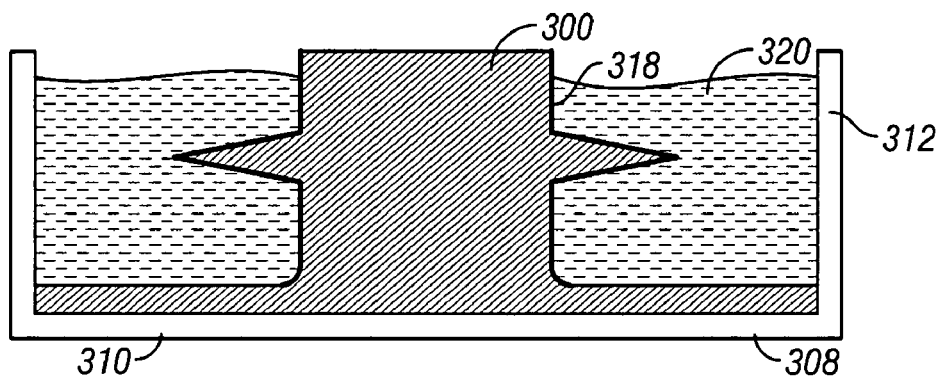
FIG. 38 is a cross-sectional view of the primary blank of substantially rigid material of FIG. 37 soaking in a chemical solution within the cup.

Referring to FIG. 38, the next step involves treating the coating to further promote adhesion to the substantially flexible material. This step entails softening the coating by pouring a chemical solution 320 into the cup 308 and soaking the substantially rigid portion 300 for a predetermined amount of time. Chemical solution 320 preferably contains MMA. In addition, the predetermined soaking time preferably is from about 5 seconds to about 20 minutes, most preferably for about 15 seconds. Softening the coating further facilitates subsequent bonding between the soft and hard materials that form the hybrid contact lens. After soaking is completed, the chemical solution 320 is removed from the cup 308 by way of a suction pump or other drainage device.

Figure 39:
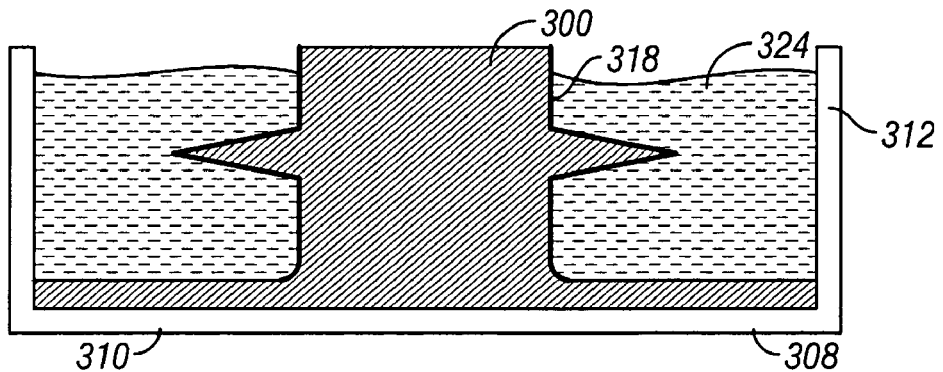
FIG. 39 is a cross-sectional view of the primary blank of substantially rigid material of FIG. 37 soaking in another chemical solution within the cup.

Referring to FIG. 39, the next step involves further treating the coating to promote adhesion to the substantially flexible material. This step entails pouring another chemical solution 324 into cup 308 and soaking the substantially rigid portion 300 for a predetermined amount of time. Chemical solution 324 preferably contains MMA, as well as an adhesion promoter and a UV activator. The predetermined amount of time for soaking is from about 5 second to about 20 minutes, most preferably for about 15 seconds. Depending upon the type of material used for the substantially rigid portion 300, the above-disclosed soaking steps may be performed in a different order. Alternatively, one or more of the soaking steps may be eliminated depending upon the substantially rigid material employed.

Figure 40:
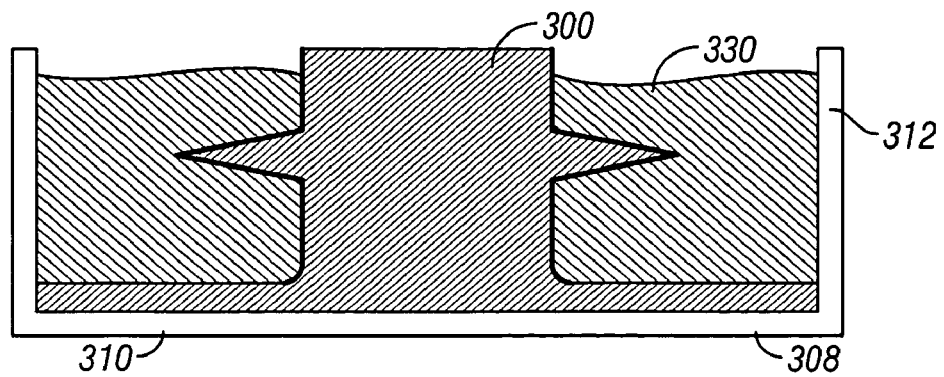
FIG. 40 is a cross-sectional view of the primary blank of substantially rigid material of FIG. 37 after liquefied substantially flexible material has been poured and cured.

After the soaking steps are completed, the chemical solution 324 is removed from the cup 308 by way of a suction pump or other drainage device. Then, excess chemical solution on the substantially rigid portion 300 is removed by spinning. According to some embodiments, spinning is carried out for approximately 6 seconds at a speed of 1350 rpm or greater. Referring to FIG. 40, the next steps involve pouring liquefied substantially flexible material 330 into the cup 308 around the substantially rigid center portion and curing the substantially flexible material 330. Preferably, the time between pouring and curing is kept to a minimum, for example less than 1 minute.

The step of curing the substantially flexible material 330 is achieved by applying a UV activator to the mold for a predetermined curing time. Preferably, a very slow cure is performed under visible UV light for approximately 45 minutes. In the next step, UV curing and thermal annealing are performed simultaneously for about 2 to 3 hours. After this time period, UV curing is discontinued and thermal annealing is sustained for an additional period of time, preferably about 10 to 20 hours, most preferably about 15 hours. According to some embodiments, the thermal annealing step is performed over a defined heating/cooling profile wherein the mold is slowly heated from room temperature until reaching a peak temperature, and then slowly cooled back to room temperature.

Figure 41:
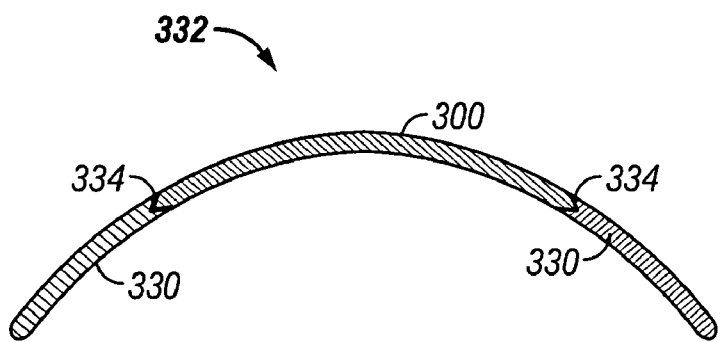
FIG. 41 is a cross-sectional view of a hybrid contact lens produced by the method of manufacturing a hybrid contact lens of FIGS. 34–40.
Figure 42:
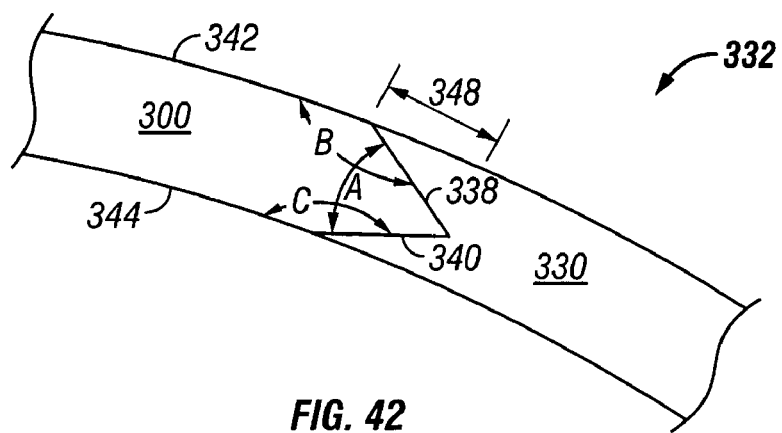
FIG. 42 is an enlarged cross-sectional view of the junction between substantially flexible and substantially rigid materials of the hybrid contact lens of FIG. 41.

Referring to FIGS. 41 and 42, after curing the flexible material, the lens is lathed or otherwise machined into a finished fracture-resistant hybrid contact lens 332 comprising substantially rigid center portion 300 and substantially flexible outer skirt portion 330. According to a preferred embodiment, center portion 300 and outer skirt portion 330 are joined at junction 334 that is substantially V-shaped in cross section. As depicted in FIG. 42, junction 334 is defined by a first segment 338 and a second segment 340, which are disposed at an angle A with respect to one another. Moreover, segment 338 is disposed at an angle B with respect to an anterior surface 342 of the lens and segment 340 is disposed at an angle C with respect to a posterior surface 344 of the lens.

According to some embodiments, the dimensions defining the V-shaped interface are selected to reduce the variance in expansion of the soft skirt near the junction, thereby improving the comfortability of the lens. Generally, less expansion of the soft skirt material results in a smoother transition between the soft and hard portions. Since the expansion of the soft skirt material is a percentage of the material thickness, angles A, B and C are chosen to limit the amount of soft skirt material in a transition area 348 encompassing junction 334. Angle A may be any angle between about 5 degrees and about 175 degrees, preferably between about 15 degrees and about 90 degrees. Angle B may be any angle between about 5 degrees and about 175 degrees, preferably between about 100 degrees and about 165 degrees. Angle C may be any angle between about 5 degrees and about 175 degrees, preferably between about 100 degrees and about 165 degrees.

An additional advantage of providing a V-shaped junction is the resultant increase in surface area between the rigid and soft skirt components improves bonding strength between the two materials and minimizes lens breakage, or failure. A further advantage is that the anterior and posterior surfaces of the transition area 348 consist primarily of the substantially flexible material 330, which provides increased comfort for the user. According to alternative embodiments, junction 334 may comprise a single segment disposed at an angle with respect to the contact lens, as disclosed with respect to FIG. 6. In addition, junction 334 may include a variety of surface configurations, or geometries, such as including ledges, protuberances, or projections, serrations, gradations, or any other shape that is not substantially straight, or planar.

Suitable materials for the substantially flexible portion 330 include, but are not limited to: hydroxyethylmethacrylate (HEMA); methyl methacrylate (MMA); Ethyl methacylate (EMA); aminoaklyl containing acrylate or methacrylate; N-vinyl pyrrolidone (NVP); 2-methoxyethyl methacrylate (MEMA); ethylene glycol methacrylate (EGMA); trifluoropropyl methacrylate; pentafluoropentyl methacylate; N,N-dimethylacrylamide (DMA); acrylamide; methacylamide; tetramethyldisiloxane ethylene glycol dimethacrylate; perfluorophenyl methacrylate; 2-(trimethylsiloxyl)ethyl methacrylate; N-fluoroalkyl methacylamide; bis(2-methacryloxyphenyl)-propane; (N,N-dimethylamino-ethyl) methacrylate; silicon hydrogels such as Cibavision lotrafilcon; and any combination of these materials. As would be understood to those of ordinary skill in the art, the above list is by no means exhaustive as other soft skirt materials may be employed as the substantially flexible portion without departing from the scope of the present invention.

Suitable materials for the substantially rigid portion 300 include, but are not limited to: fluorosilicone acrylate; siliconated, styrene; fluoroacrylate; fluorometharylate, perfluorianted acrylate and methacrylate; any high DK or Hyper DK gas permeable rigid contact lens bottoms with DK of 70 (ISO), such as Boston 7 Envision, Boston EO, Boston Equales, Boston Equalens 2, Boston XO, Fluoroperm 151, Fluoroperm 92, Fluoroperm 92, Fluoro 700, Menicon SE-P, Menicon Z; any other high DK materials; and any combination of these materials. Of course, as would be understood to those of ordinary skill in the art, this list is by no means exhaustive as other materials may be employed as the substantially rigid portion without departing from the scope of the present invention.

Thus, it is seen that a hybrid hard-soft contact lens system, method, method of manufacture and article of manufacture is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. It is noted that various equivalents for the particular embodiments discussed in this description may practice the invention as well.

What is claimed is:

1. A method of manufacturing a hybrid contact lens having a substantially rigid center portion and a substantially flexible peripheral outer portion, the method comprising the steps of:
   forming the substantially rigid center portion having a Dk greater than $30 \times 10^{-11}$ [cm$^3$/sec][ml O$_2$/ml mm Hg];
   treating the substantially rigid center portion to form a coating on the perimeter of the substantially rigid potion;
   forming the substantially flexible peripheral outer portion around the substantially rigid center portion; and
   chemically bonding the substantially flexible peripheral outer portion to the substantially rigid center portion.

2. The method of claim 1, wherein the step of forming the substantially rigid center portion comprises machining a rod of rigid gas permeable material into a primary blank.

3. The method of claim 1, wherein the step of forming the substantially rigid center portion comprises machining the substantially rigid center portion to form the shape of an interface between the substantially rigid and substantially flexible materials.

4. The method of claim 3, wherein the interface is substantially V-shaped.

5. The method of claim 3, wherein the interface comprises an angled surface.

6. The method of claim 1, wherein the step of treating the substantially rigid portion to form a coating comprises soaking the substantially rigid portion in a chemical solution for a predetermined amount of time.

7. The method of claim 6, wherein the chemical solution contains MMA.

8. The method of claim 6, wherein the predetermined amount of time is from 5 seconds to 20 seconds.

9. The method of claim 1, wherein the step of treating the substantially rigid portion to form a coating comprises applying a catalyst to the substantially rigid portion.

10. The method of claim 9, wherein the catalyst is a UV activator.

11. The method of claim 1, wherein the coating slows the penetration of chemical solution into the substantially rigid portion.

12. The method of claim 1, wherein the coating facilitates chemical bonding between the substantially rigid center portion and the substantially flexible outer portion.

13. The method of claim 1, wherein the coating prevents modification of the physical characteristics of the substantially rigid center portion.

14. The method of claim 1, further comprising the step of treating the coating to promote chemical bonding between the rigid center portion and the substantially flexible outer portion.

15. The method of claim 14, wherein the step of treating the coating comprises softening the coating.

16. The method of claim 14, wherein the step of treating the coating comprises soaking the substantially rigid portion in a chemical solution for a predetermined amount of time.

17. The method of claim 16, wherein the chemical solution contains MMA.

18. The method of claim 16, wherein the chemical solution contains MMA, an adhesion promoter and a UV activator.

19. The method of claim 16, wherein the predetermined amount of time is from 5 seconds to 20 minutes.

20. The method of claim 16, further comprising the step of spinning the substantially rigid portion to remove excess chemical solution.

21. The method of claim 1, wherein the step of forming the substantially flexible outer portion comprises pouring liquefied substantially flexible material around the substantially rigid center potion and curing the substantially flexible material.

22. The method of claim 21, wherein the amount of time between pouring and curing is less than 1 minute.

23. The method of claim 21, wherein the step of curing the substantially flexible material comprises applying a UV activator to the mold for a predetermined curing time.

24. The method of claim 21, wherein the step of curing the substantially flexible material comprises curing using a UV activator and thermal annealing.

25. The method of claim 24, wherein UV curing and thermal annealing are performed simultaneously for a period of 2 to 3 hours.

26. The method of claim 25, wherein UV curing is discontinued and thermal annealing is sustained for an additional period of 10 to 20 hours.

27. A hybrid contact lens, comprising:
a substantially rigid center portion having a Dk greater than $30 \times 10^-$ $[cm^3/sec][ml\ O_2/ml\ mm\ Hg]$;
a substantially flexible peripheral outer portion; and
a coating disposed between the substantially rigid center portion and the substantially flexible peripheral outer portion,
wherein the substantially rigid center portion and the substantially flexible peripheral outer portion are joined at a junction comprising a first segment and a second segment, the junction defined at a circumferential edge of the substantially rigid center portion.

28. The hybrid contact lens of claim 27, wherein the junction has a substantially V-shaped cross section.

29. The hybrid contact lens of claim 27, wherein the first segment is disposed at an angle with respect to the second segment.

30. The hybrid contact lens of claim 29, wherein the angle is between 15 degrees and 90 degrees.

31. The hybrid contact lens of claim 27, wherein the first segment is disposed at an angle with respect to an anterior surface of the hybrid contact lens.

32. The hybrid contact lens of claim 31, wherein the angle is between 100 degrees and 165 degrees.

33. The hybrid contact lens of claim 27, wherein the second segment is disposed at an angle with respect to a posterior surface of the hybrid contact lens.

34. The hybrid contact lens of claim 33, wherein the angle is between 100 degrees and 165 degrees.

35. The hybrid contact lens of claim 27, wherein the shape of the junction is selected to reduce the variance in expansion of the substantially flexible outer portion.

36. The hybrid contact lens of claim 27, wherein the shape of the junction is selected to create a smooth transition between the substantially rigid portion and the substantially flexible outer portion.

37. The hybrid contact lens of claim 27, wherein the shape of the junction is selected to limit the amount of substantially flexible material disposed in a transition area of the lens that encompasses the junction.

38. The hybrid contact lens of claim 27, wherein the shape of the junction is selected to improve the bonding strength between the substantially rigid portion and the substantially flexible outer portion.

39. A method of manufacturing a hybrid contact lens having a substantially rigid center portion and a substantially flexible peripheral outer portion, the method comprising the steps of:
providing the substantially rigid center portion having a Dk greater than $30 \times 10^-$ $[cm^3/sec][ml\ O_2/ml\ mm\ Hg]$;
forming a coating on the perimeter of the substantially rigid portion; and
chemically bonding the substantially flexible peripheral outer portion to the substantially rigid portion at a junction defined by a circumferential edge of the substantially rigid portion.

40. The method of claim 39, wherein an interface between the substantially rigid center portion and the substantially flexible outer portion is substantially V-shaped.

41. The method of claim 39, wherein an interface between the substantially rigid center portion and the substantially flexible outer portion comprises an angled surface.

42. The method of claim 39, wherein the step of forming a coating comprises soaking the substantially rigid portion in a chemical solution for a predetermined amount of time.

43. The method of claim 42, wherein the chemical solution contains MMA.

44. The method of claim 39, wherein the coating slows the penetration of chemical solution into substantially rigid portion.

45. The method of claim 39, wherein the coating facilitates chemical bonding between the substantially rigid center portion and the substantially flexible outer portion.

46. The method of claim 39, wherein the coating prevents modification of the physical characteristics of the substantially rigid center portion.

47. The method of claim 39, further comprising the step of treating the coating to promote chemical bonding between the rigid center portion and the substantially flexible outer portion.

48. The method of claim 39, wherein the step of chemically bonding the substantially flexible portion to the substantially rigid portion comprises pouring liquefied substantially flexible material around the substantially rigid center portion and curing the substantially flexible material.

49. The hybrid contact lens of claim 29, wherein the angle is between 5 degrees and 175 degrees.

\* \* \* \* \*

UNITED STATES PATENT AND TRADEMARK OFFICE
CERTIFICATE OF CORRECTION

PATENT NO. : 7,104,648 B2
APPLICATION NO. : 10/841726
DATED : September 12, 2006
INVENTOR(S) : Ali Dahi et al.

Page 1 of 1

It is certified that error appears in the above-identified patent and that said Letters Patent is hereby corrected as shown below:

In the Claims

Column 24, line 50, in Claim 1 please delete "$30 \times 10^{-11}$ [cm$^3$/sec][ml O$_2$/ml mm Hg]" and insert -- $30 \times 10^{-11}$ [cm$^2$/sec][ml O$_2$/ml mm Hg] --, therefor.

Column 25, line 66, in Claim 27 please delete "$30 \times 10^-$ [cm$^3$/sec][ml O$_2$/ml mm Hg]" and insert -- $30 \times 10^{-11}$ [cm$^2$/sec][ml O$_2$/ml mm Hg] --, therefor.

Column 26, line 46, in Claim 39 please delete "$30 \times 10^-$ [cm$^3$/sec][ml O$_2$/ml mm Hg]" and insert -- $30 \times 10^{-11}$ [cm$^2$/sec][ml O$_2$/ml mm Hg] --, therefor.

Signed and Sealed this
Twenty-fifth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 7,104,648 B2
APPLICATION NO. : 10/841726
DATED : September 12, 2006
INVENTOR(S) : Dahi et al.

It is certified that error appears in the above-identified patent and that said Letters Patent is hereby corrected as shown below:

On the Title Page
    At column 2 on page 1 (Foreign Patent Documents), line 1, after "7/1973", please insert -- GO2C 7/04 --.

In the Specification
    At column 1 on page 3, line 61, after "lens" please insert -- . --.
    At column 2 on page 4, line 29, delete "hexylmethacylate." and insert -- hexylmethacylate --, therefor.
    At column 6 on page 12, line 21, delete "(poly-2-hydroxyethyl-methacrylate)," and insert -- (poly-2-hydroxyethyl methacrylate), --, therefor.
    At column 13 on page 26, line 35, please delete "Tscheming" and insert -- Tscherning --, therefor.
    At column 14 on page 28, line 67, please delete "ehtylacylate" and insert -- ethylacylate --, therefor.
    At column 20 on page 39, line 40-41, please delete "trimeththylsiloxyl;" and insert -- trimethylsiloxyl; --, therefor.
    At column 20 on page 39, line 46-47, please delete "N-[2-(n,n-dimethylamino)ethy];" and insert -- N-[2-(n,n-dimethylamino)ethyl]; --, therefor.
    At column 20 on page 39, line 47, please delete "methacryalte;" and insert -- methacrylate; --, therefor.
    At column 20 on page 39, line 47, please delete "vinyl-pyrolidone;" and insert -- vinyl pyrolidone; --, therefor.

Signed and Sealed this
Fifteenth Day of July, 2014

Michelle K. Lee
*Deputy Director of the United States Patent and Trademark Office*

CERTIFICATE OF CORRECTION (continued)

At column 20 on page 39, line 47-48, please delete "N,N-di-mathacrylamide;" and insert -- N,N-di-methacrylamide; --, therefor.

At column 20 on page 40, line 61, please delete "polyethylaneglycol;" and insert -- polyethyleneglycol; --, therefor.

At column 20 on page 40, line 63, please delete "ehtylacylate" and insert -- ethylacylate --, therefor.

At column 20 on page 40, line 64, please delete "trimethylesiloxy;" and insert -- trimethylsiloxy; --, therefor.

In the Claims

At column 25 on page 3, line 2 in Claim 16, please delete "predetennined" and insert -- predetermined --, therefor.

At column 25 on page 4, line 2, in Claim 27, please delete "$30 \times 10$" and insert -- $30 \times 10^{-11}$ --, therefor.

At column 26 on page 5, line 4, in Claim 39, please delete "$30 \times 10$" and insert -- $30 \times 10^{-11}$ --, therefor.

UNITED STATES PATENT AND TRADEMARK OFFICE
CERTIFICATE OF CORRECTION

PATENT NO. : 7,104,648 B2  
APPLICATION NO. : 10/841726  
DATED : September 12, 2006  
INVENTOR(S) : Dahi et al.

Page 1 of 2

It is certified that error appears in the above-identified patent and that said Letters Patent is hereby corrected as shown below:

On the Title Page

At column 2 on page 1 (Foreign Patent Documents), line 1, after "7/1973", please insert -- GO2C 7/04 --.

In the Specification

At column 1 on page 3, line 61, after "lens" please insert -- . --.

At column 2 on page 4, line 29, delete "hexylmethacylate." and insert -- hexylmethacylate --, therefor.

At column 6 on page 12, line 21, delete "(poly-2-hydroxyethyl-methacrylate)," and insert -- (poly-2-hydroxyethyl methacrylate), --, therefor.

At column 13 on page 26, line 35, please delete "Tscheming" and insert -- Tscherning --, therefor.

At column 14 on page 28, line 67, please delete "ehtylacylate" and insert -- ethylacylate --, therefor.

At column 20 on page 39, line 40-41, please delete "trimeththylsiloxyl;" and insert -- trimethylsiloxyl; --, therefor.

At column 20 on page 39, line 46-47, please delete "N-[2-(n,n-dimethylamino)ethy];" and insert -- N-[2-(n,n-dimethylamino)ethyl]; --, therefor.

At column 20 on page 39, line 47, please delete "methacryalte;" and insert -- methacrylate; --, therefor.

This certificate supersedes the Certificate of Correction issued July 15, 2014.

Signed and Sealed this  
Twelfth Day of August, 2014

Michelle K. Lee  
*Deputy Director of the United States Patent and Trademark Office*

CERTIFICATE OF CORRECTION (continued)
U.S. Pat. No. 7,104,648 B2

At column 20 on page 39, line 47, please delete "vinyl-pyrolidone;" and insert -- vinyl pyrolidone; --, therefor.

At column 20 on page 39, line 47-48, please delete "N,N-di-mathacrylamide;" and insert -- N,N-di-methacrylamide; --, therefor.

At column 20 on page 40, line 61, please delete "polyethylaneglycol;" and insert -- polyethyleneglycol; --, therefor.

At column 20 on page 40, line 63, please delete "ehtylacylate" and insert -- ethylacylate --, therefor.

At column 20 on page 40, line 64, please delete "trimethylesiloxy;" and insert -- trimethylsiloxy; --, therefor.

In the Claims

At column 25 on page 3, line 33 in Claim 16, please delete "predetennined" and insert -- predetermined --, therefor.

At column 25 on page 4, line 66, in Claim 27, please delete "$30 \times 10$" and insert -- $30 \times 10^{-11}$ --, therefor.

At column 26 on page 5, line 46, in Claim 39, please delete "$30 \times 10$" and insert -- $30 \times 10^{-11}$ --, therefor.